US012786445B2

(12) United States Patent
Liu et al.

(10) Patent No.: US 12,786,445 B2
(45) Date of Patent: Nov. 3, 2026

(54) TEMPORAL RESAMPLING AND RESTORATION IN VIDEO CODING AND DECODING SYSTEMS

(71) Applicant: Tencent America LLC, Palo Alto, CA (US)

(72) Inventors: Shan Liu, San Jose, CA (US); Ding Ding, Washington, DC (US); Roman Chernyak, Santa Clara, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/059,521

(22) Filed: Feb. 21, 2025

(65) Prior Publication Data

US 2025/0324072 A1 Oct. 16, 2025

Related U.S. Application Data

(60) Provisional application No. 63/645,811, filed on May 10, 2024, provisional application No. 63/636,762,
(Continued)

(51) Int. Cl.
*H04N 19/31* (2014.01)
*H04N 19/46* (2014.01)
*H04N 19/70* (2014.01)

(52) U.S. Cl.
CPC ............ *H04N 19/31* (2014.11); *H04N 19/46* (2014.11); *H04N 19/70* (2014.11)

(58) Field of Classification Search
CPC ........ H04N 19/31; H04N 19/46; H04N 19/70; H04N 19/132; H04N 19/172; H04N 19/177; H04N 19/59
See application file for complete search history.

(56) References Cited

U.S. PATENT DOCUMENTS

2024/0305829 A1* 9/2024 Deshpande ............ H04N 19/70
2025/0234018 A1* 7/2025 Lee ...................... H04N 19/167

FOREIGN PATENT DOCUMENTS

CN 117640929 A * 3/2024 ........... G06T 7/0002
KR 20170129750 A * 11/2017 ........... H04N 19/593
(Continued)

OTHER PUBLICATIONS

ISO/IEC 23888-2:####(X), ISO/IEC JTC 1/SC 29/WG 4, "Information technology—Artificial intelligence for multimedia—Part 2: Video coding for machines," WD 2, Vernier, Geneva, dated Feb. 2024, 36 pages.

*Primary Examiner* — Tracy Y. Li
(74) *Attorney, Agent, or Firm* — Crowell & Moring LLP

(57) ABSTRACT

This disclosure relates generally to video coding/decoding and particularly for signaling in temporal resampling and restoration in video coding and/or decoding systems. One method includes obtaining, by a device, a coded video bitstream; determining, by the device from the coded video bitstream, a sequence-level temporal restoration flag for a picture sequence; when the sequence-level temporal restoration flag indicates that temporal restoration is enabled for the picture sequence, determining, by the device from the coded video bitstream, an index indicating a temporal resampling ratio; and decoding, by the device, the coded video bitstream by generating temporal resampling data based on the temporal resampling ratio.

20 Claims, 11 Drawing Sheets

Related U.S. Application Data filed on Apr. 20, 2024, provisional application No. 63/633,763, filed on Apr. 13, 2024.

(56) References Cited

FOREIGN PATENT DOCUMENTS

| | | | | | |
|---|---|---|---|---|---|
| KR | 20240026180 | A | * | 2/2024 | H04N 19/159 |
| WO | WO-2022191064 | A1 | * | 9/2022 | H04N 19/136 |
| WO | WO-2023200237 | A1 | * | 10/2023 | H04N 19/11 |

* cited by examiner

TEMPORAL RESAMPLING AND RESTORATION IN VIDEO CODING AND DECODING SYSTEMS

INCORPORATION BY REFERENCE

This application is based on and claims the benefit of priority to U.S. Provisional Application No. 63/633,763, filed on Apr. 13, 2024, which is herein incorporated by reference in its entirety. This application is also based on and claims the benefit of priority to U.S. Provisional Application No. 63/636,762, filed on Apr. 20, 2024, which is herein incorporated by reference in its entirety. This application is also based on and claims the benefit of priority to U.S. Provisional Application No. 63/645,811, filed on May 10, 2024, which is herein incorporated by reference in its entirety.

TECHNICAL FIELD

This disclosure describes a set of advanced video/streaming coding/decoding technologies. More specifically, the disclosed technology involves temporal resampling and restoration.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

With the rise of machine learning applications, along with the abundance of sensors, many intelligent platforms have utilized video for machine vision tasks such as object detection, segmentation, and/or tracking. As a result, encoding video or images for consumption by machine tasks has become an interesting and challenging problem. This has led to the introduction of Video Coding for Machines (VCM) studies.

While the various embodiments in the present disclosure are described in the context of VCM, the underlying principles are generally applicable other video coding systems.

SUMMARY

The present disclosure describes various embodiments of methods, apparatus, and computer-readable storage medium for improvement of temporal resampling and restoration in video coding and/or decoding systems.

According to one aspect, an embodiment of the present disclosure provides a method for decoding a coded video bitstream. The method includes obtaining, by a device, a coded video bitstream. The device includes a memory storing instructions and a processor in communication with the memory. The method also includes determining, by the device from the coded video bitstream, a sequence-level temporal restoration flag for a picture sequence; when the sequence-level temporal restoration flag indicates that temporal restoration is enabled for the picture sequence, determining, by the device from the coded video bitstream, an index indicating a temporal resampling ratio; and decoding, by the device, the coded video bitstream by generating temporal resampling data based on the temporal resampling ratio.

According to another aspect, an embodiment of the present disclosure provides a method for encoding a video. The method includes obtaining, by a device, a video. The device includes a memory storing instructions and a processor in communication with the memory. The method also includes determining, by the device based on the video, a sequence-level temporal restoration flag for a picture sequence; when the sequence-level temporal restoration flag indicates that temporal restoration is enabled for the picture sequence, determining, by the device based on the video, an index indicating a temporal resampling ratio; and encoding, by the device, the video into a coded video bitstream by downsampling based on the temporal resampling ratio.

According to another aspect, an embodiment of the present disclosure provides a method for creating and/or storing and/or transmitting and/or decoding an encoded bitstream of a video. The encoded bitstream may include a sequence-level temporal restoration flag for a picture sequence; and when the sequence-level temporal restoration flag indicates that temporal restoration is enabled for the picture sequence, an index indicating a temporal resampling ratio, so that the encoded bitstream is configured to be decoded by generating temporal resampling data based on the temporal resampling ratio.

According to another aspect, an embodiment of the present disclosure provides an apparatus. The apparatus includes a memory storing instructions; and a processor in communication with the memory. When the processor executes the instructions, the processor is configured to cause the apparatus to perform any method as described above and/or elsewhere in the present disclosure.

In another aspect, an embodiment of the present disclosure provides non-transitory computer-readable mediums storing instructions, which, when executed by a computer, cause the computer to perform any method as described above and/or elsewhere in the present disclosure.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
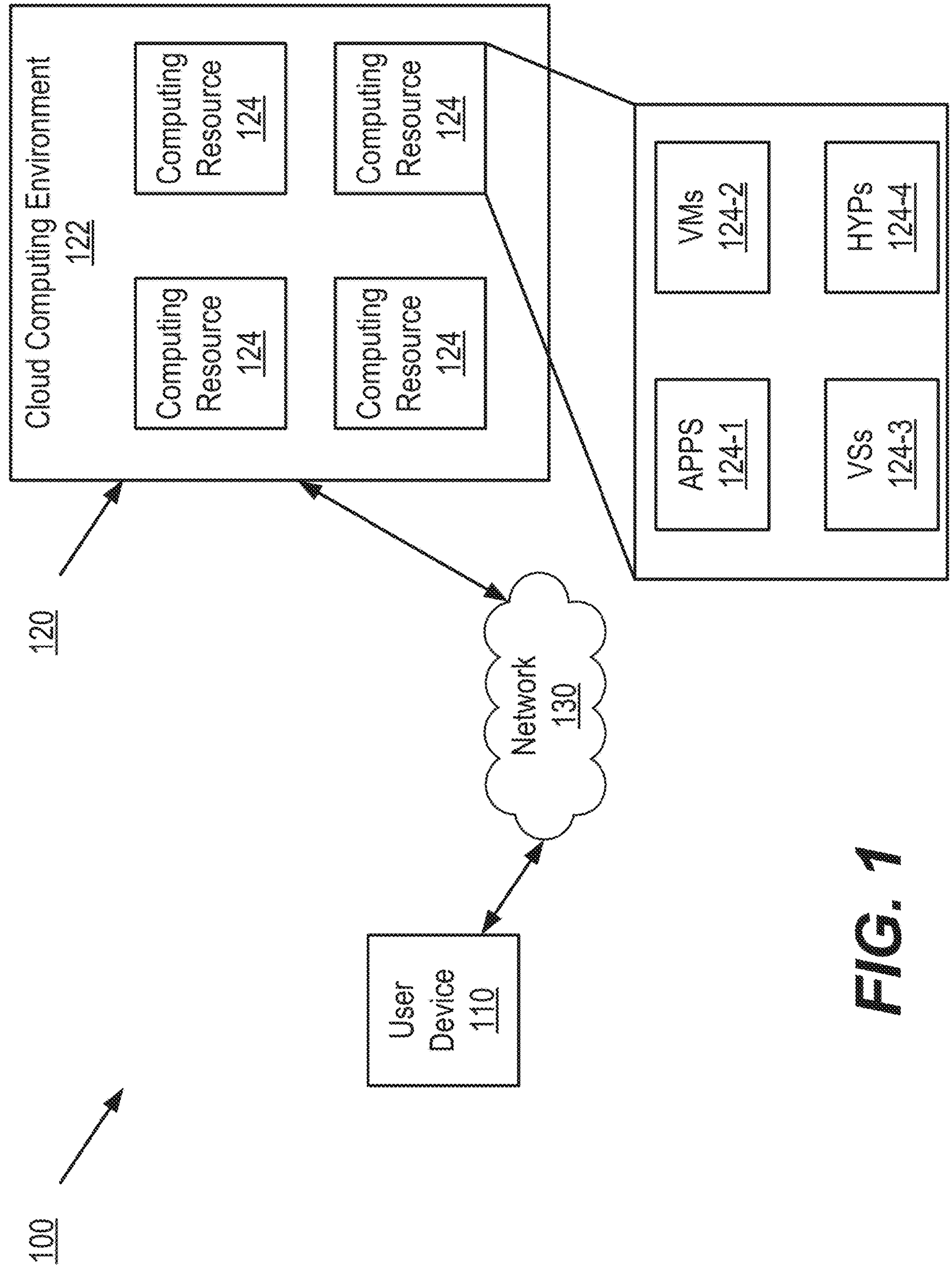
FIG. 1 is a diagram of an environment in which methods, apparatuses, and systems described herein may be implemented, according to embodiments.

FIG. 1 is a diagram of an application environment 100 in which methods, apparatuses, and systems described herein may be implemented, according to the example embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown in FIG. 1, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

The techniques and implementations described below can be implemented as computer software using computer-readable instructions and physically stored in one or more computer-readable media. For example, FIG. 2 shows a computer system (200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 2:
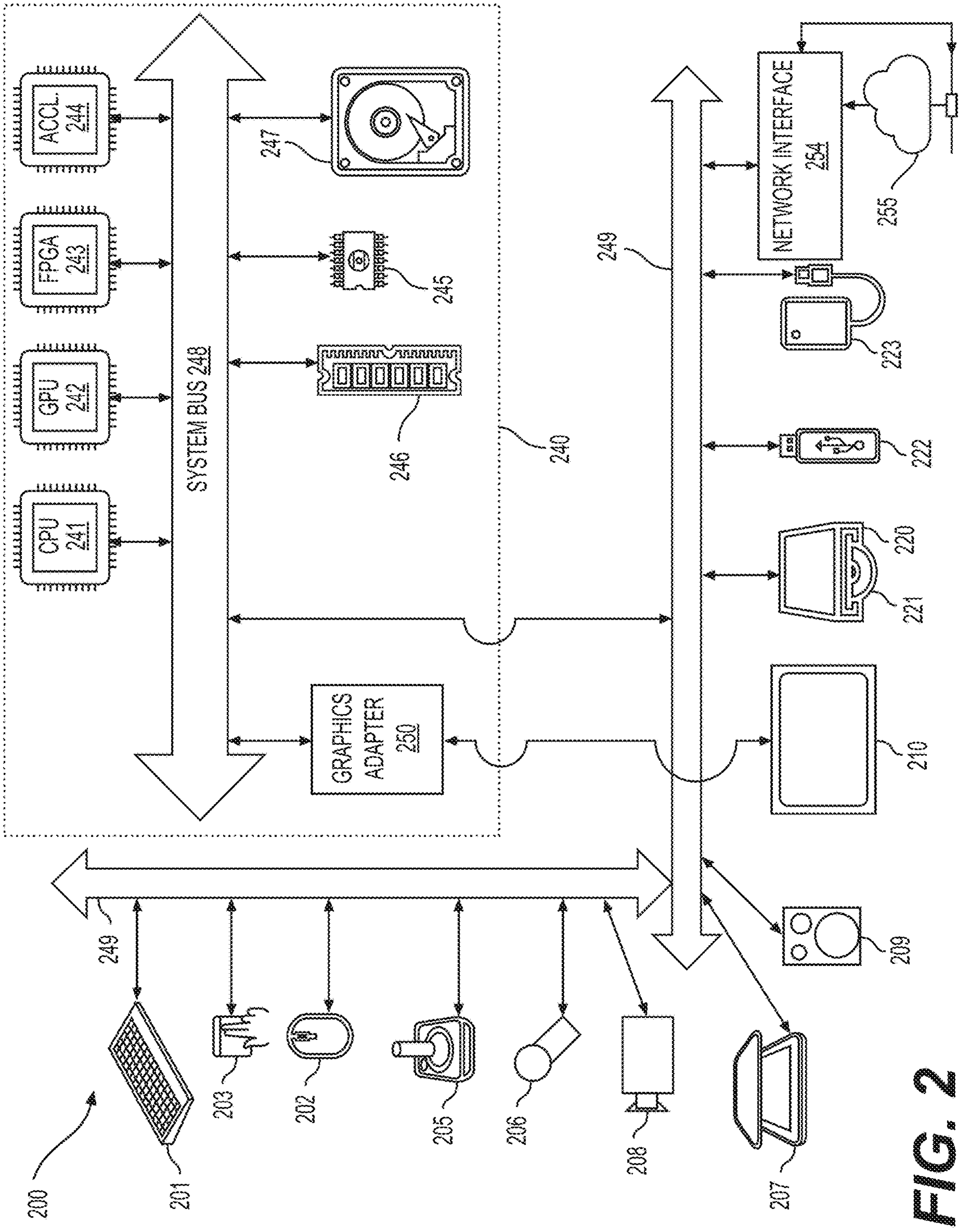
FIG. 2 is a schematic illustration of an example computer system in accordance with an embodiment.

The components shown in FIG. 2 for computer system (200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (200).

Computer system (200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (201), mouse (202), trackpad (203), touch screen (210), data-glove (not shown), joystick (205), microphone (206), scanner (207), camera (208).

Computer system (200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (210), data-glove (not shown), or joystick (205), but there can also be tactile feedback devices that do not serve as input devices), audio output devices (such as: speakers (209), headphones (not depicted)), visual output devices (such as screens (210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (200) can also include human accessible storage devices and their associated media such as optical media including CD/DVD ROM/RW (220) with CD/DVD or the like media (221), thumb-drive (222), removable hard drive or solid state drive (223), legacy magnetic media such as tape and floppy disc (not depicted), specialized ROM/ASIC/PLD based devices such as security dongles (not depicted), and the like. Those skilled in the art should also understand that term "computer readable media" as used in connection with the presently disclosed subject matter does not encompass transmission media, carrier waves, or other transitory signals.

Computer system (200) can also include an interface (254) to one or more communication networks (255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general-purpose data ports or peripheral buses (249) (such as, for example USB ports of the computer system (200)); others are commonly integrated into the core of the computer system (200) by attachment to a system bus as described below (for example Ethernet interface into a PC computer system or cellular network interface into a smartphone computer system). Using any of these networks, computer system (200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (240) of the computer system (200).

The core (240) can include one or more Central Processing Units (CPU) (241), Graphics Processing Units (GPU) (242), specialized programmable processing units in the form of Field Programmable Gate Areas (FPGA) (243), hardware accelerators for certain tasks (244), graphics adapters (250), and so forth. These devices, along with Read-only memory (ROM) (245), Random-access memory (246), internal mass storage such as internal non-user accessible hard drives, SSDs, and the like (247), may be connected through a system bus (248). In some computer systems, the system bus (248) can be accessible in the form of one or more physical plugs to enable extensions by additional CPUs, GPU, and the like. The peripheral devices can be attached either directly to the core's system bus (248), or through a peripheral bus (249). In an example, the screen (210) can be connected to the graphics adapter (250). Architectures for a peripheral bus include PCI, USB, and the like.

CPUs (241), GPUs (242), FPGAs (243), and accelerators (244) can execute certain instructions that, in combination, can make up the aforementioned computer code. That computer code can be stored in ROM (245) or RAM (246). Transitional data can be also be stored in RAM (246), whereas permanent data can be stored for example, in the internal mass storage (247). Fast storage and retrieve to any of the memory devices can be enabled through the use of cache memory, that can be closely associated with one or more CPU (241), GPU (242), mass storage (247), ROM (245), RAM (246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (200), and specifically the core (240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (240) that are of non-transitory nature, such as core-internal mass storage (247) or ROM (245). The software implementing various embodiments of the present disclosure can be stored in such devices and executed by core (240). A computer-readable medium can include one or more memory devices or chips, according to particular needs. The software can cause the core (240) and specifically the processors therein (including CPU, GPU, FPGA, and the like) to execute particular processes or particular parts of particular processes described herein, including defining data structures stored in RAM (246) and modifying such data structures according to the processes defined by the software. In addition, or as an alternative, the computer system can provide functionality as a result of logic hardwired or otherwise embodied in a circuit (for example: accelerator (244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
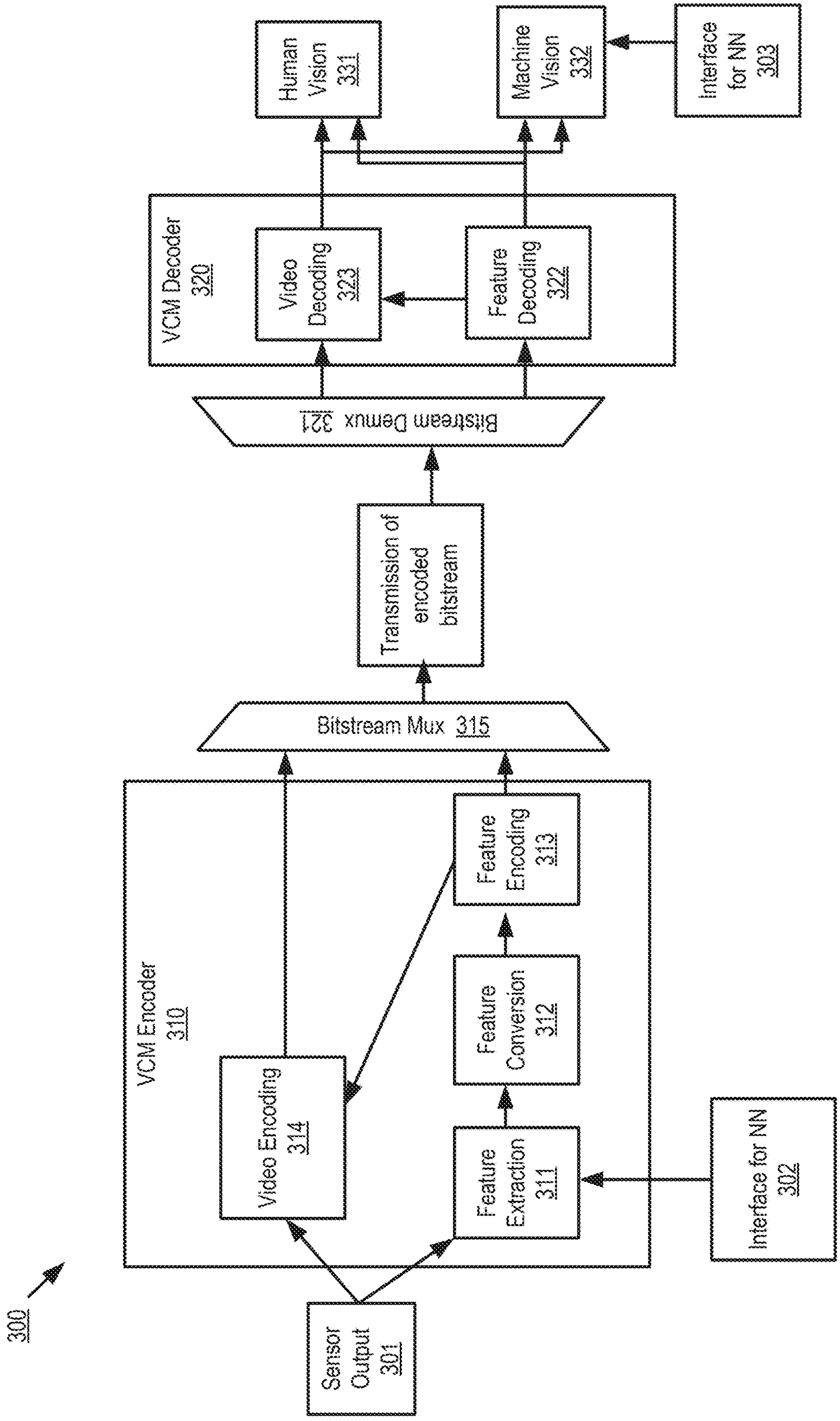
FIG. 3 is a block diagram of an example architecture for performing video coding, according to embodiments.

FIG. 3 is a block diagram of an example architecture 300 for performing video coding, according to embodiments. In embodiments, the architecture 300 may be a video coding for machines (VCM) architecture, or an architecture that is otherwise compatible with or configured to perform VCM coding. For example, architecture 300 may be compatible with "Use cases and requirements for Video Coding for Machines" (ISO/IEC JTC 1/SC 29/WG 2 N18), "Draft of Evaluation Framework for Video Coding for Machines" (ISO/IEC JTC 1/SC 29/WG 2 N19), and "Call for Evidence for Video Coding for Machines" (ISO/IEC JTC 1/SC 29/WG 2 N20), the disclosures of which are incorporated by reference herein in their entireties.

In embodiments, one or more of the elements illustrated in FIG. 3 may correspond to, or be implemented by, one or more of the elements discussed above with respect to FIGS. 1-2, for example one ore more of the user device 110, the platform 120, the device 200, or any of the elements included therein.

As can be seen in FIG. 3, the architecture 300 may include a VCM encoder 310 and a VCM decoder 320. In some example embodiments, the VCM encoder may receive sensor input 301, which may include for example one or more input images, or an input video. The sensor input 301 may be provided to a feature extraction module 311 which may extract features from the sensor input, and the extracted features may be converted using feature conversion module 312, and encoded using feature encoding module 313. In embodiments, the term "encoding" may include, may correspond to, or may be used interchangeably with, the term "compressing". The architecture 300 may include an interface 302, which may allow the feature extraction module 311 to interface with a neural network (NN) which may assist in performing the feature extraction.

The sensor input 301 may be provided to a video encoding module 314, which may generate an encoded video. In some example embodiments, after the features are extracted, converted, and encoded, the encoded features may be provided to the video encoding module 314, which may use the encoded features to assist in generating the encoded video. In embodiments, the video encoding module 314 may output the encoded video as an encoded video bitstream, and the feature encoding module 313 may output the encoded features as an encoded feature bitstream. In embodiments, the VCM encoder 310 may provide both the encoded video bitstream and the encoded feature bitstream to a bitstream multiplexer 315, which may generate an encoded bitstream by combining the encoded video bitstream and the encoded feature bitstream.

In embodiments, the encoded bitstream may be received by a bitstream demultiplexer (demux), which may separate the encoded bitstream into the encoded video bitstream and the encoded feature bitstream, which may be provided to the VCM decoder 320. The encoded feature bitstream may be provided to the feature decoding module 322, which may generate decoded features, and the encoded video bitstream may be provided to the video decoding module, which may generate a decoded video. In embodiments, the decoded features may also be provided to the video decoding module 323, which may use the decoded features to assist in generating the decoded video.

In embodiments, the output of the video decoding module 323 and the feature decoding module 322 may be used mainly for machine consumption, for example machine vision module 332. In embodiments, the output can also be used for human consumption, illustrated in FIG. 3 as human vision module 331. A VCM system, for example the architecture 300, from the client end, for example from the side of the VCM decoder 320, may perform video decoding to obtain the video in the sample domain first. Then one or more machine tasks to understand the video content may be performed, for example by machine vision module 332. In embodiments, the architecture 300 may include an interface 303, which may allow the machine vision module 332 to interface with an NN which may assist in performing the one or more machine tasks.

As can be seen in FIG. 3, in addition to a video encoding and decoding path, which includes the video encoding module 314 and the video decoding module 323, another path included in the architecture 300 may be a feature extraction, feature encoding, and feature decoding path, which includes the feature extraction module 311, the feature conversion module 312, the feature encoding module 313, and the feature decoding module 322.

Embodiments may relate to methods for enhancing decoded video for machine vision, human vision, or human/machine hybrid vision. In embodiments, each decoded image, which may be generated for example by the VCM decoder 320, may be enhanced for machine vision or human vision using an enhancement module and metadata sent from the encoder side. In embodiments, these methods can be applied to any VCM codec. Although some embodiments may be described using broader terms such as "image/video," or using more specific terms such as "image" and "video", it may be understood that embodiments may be applied.

Figure 4:
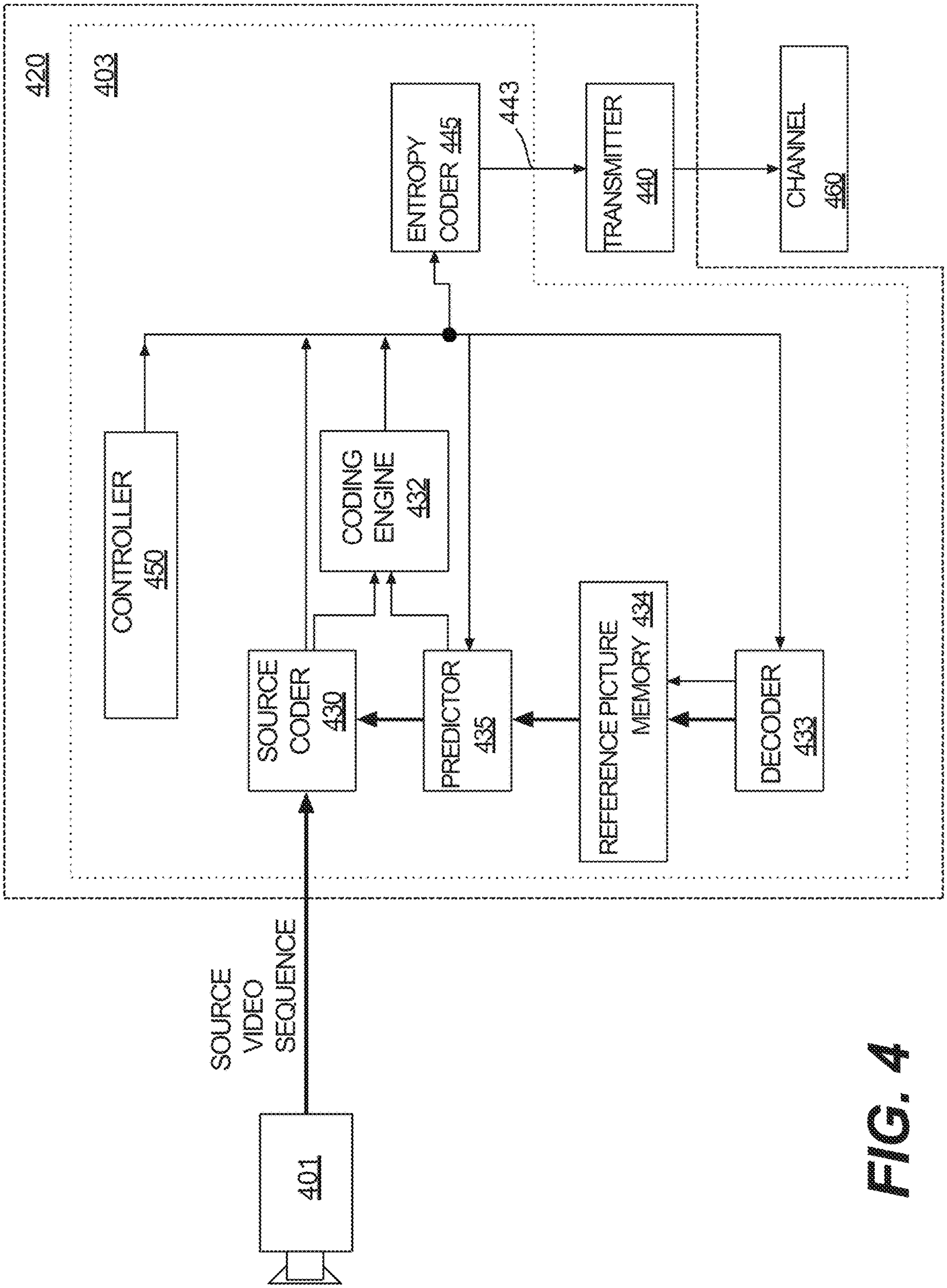
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry).

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter).

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video encoder (403) with other data to be transmitted, for example, coded audio data and/or ancillary data streams (sources not shown).

Figure 5:
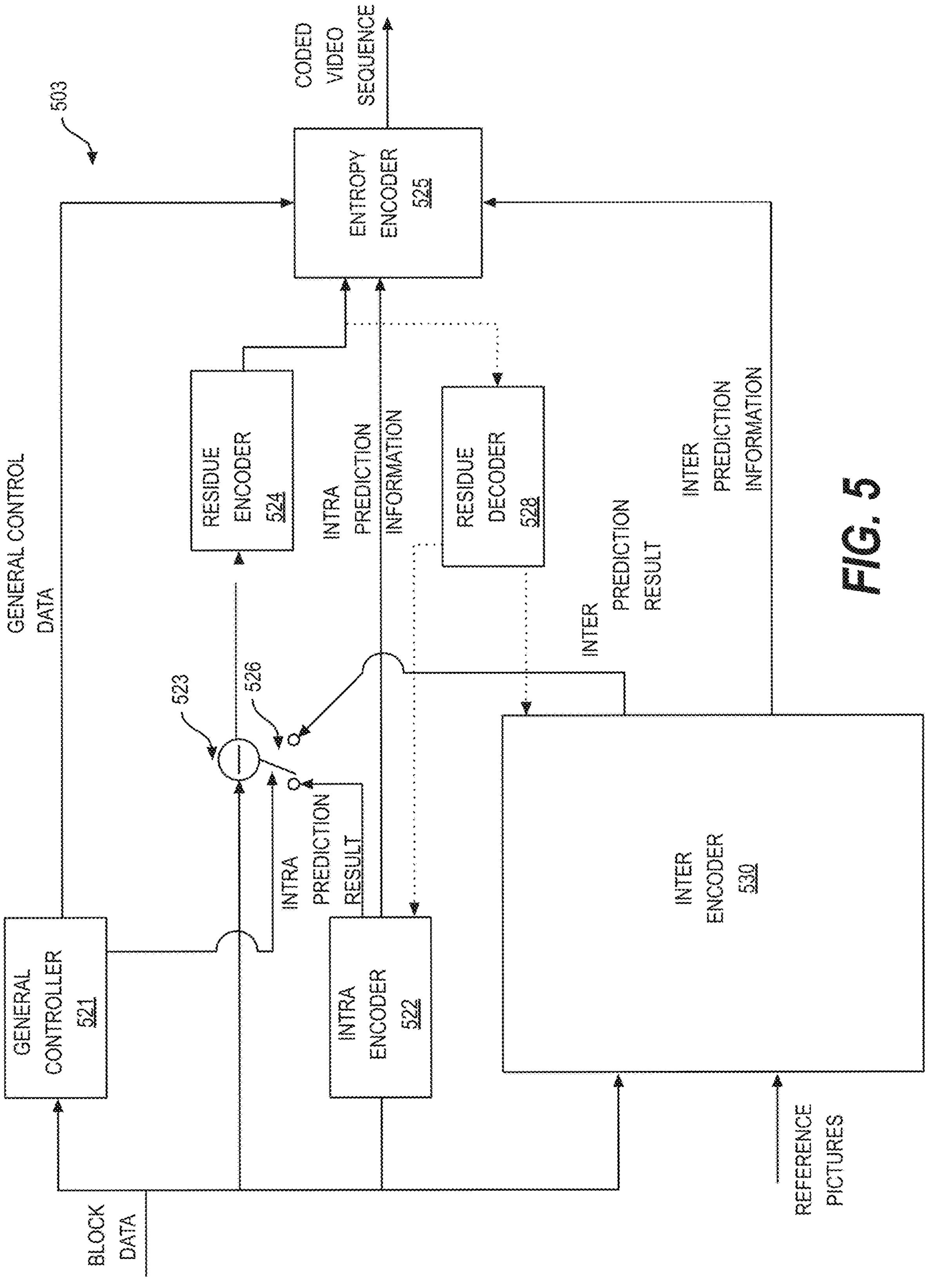
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. For example, the video encoder (503) receives a matrix of sample values for a processing block. The video encoder (503) then determines whether the processing block is best coded using intra mode, inter mode, or bi-prediction mode using, for example, rate-distortion optimization (RDO). In the example of FIG. 5, the video encoder (503) includes an inter encoder (530), an intra encoder (522), a residue calculator (523), a switch (526), a residue encoder (524), a general controller (521), and an entropy encoder (525) coupled together. In various example embodiments, the video encoder (503) also includes a residual decoder (528), which performs inverse-transform and generates the decoded residue data.

Figure 6:
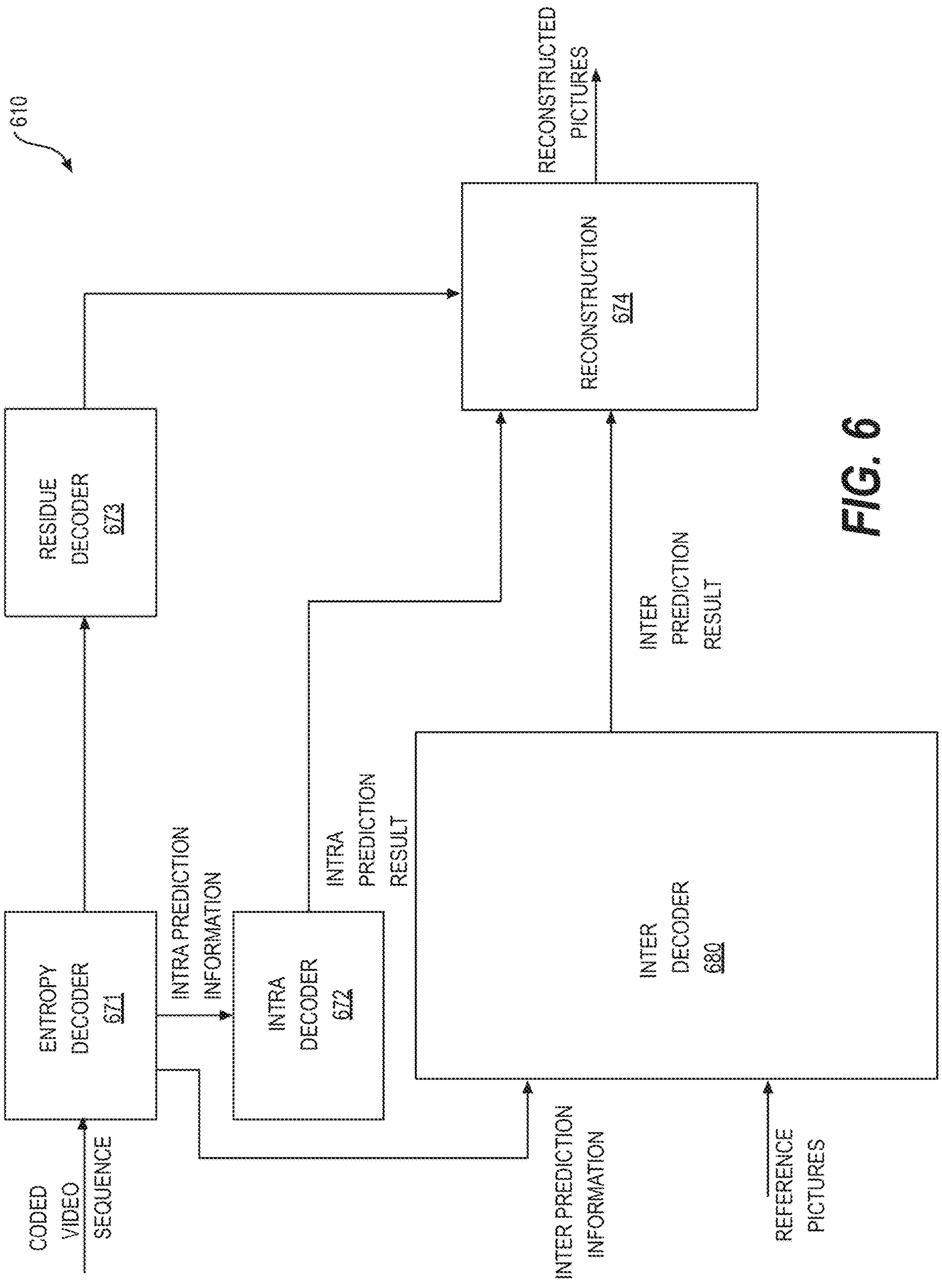
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

Video encoders and/or decoders can be implemented using any suitable technique, e.g., using one or more integrated circuits, or using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. Each of the partitions may be referred to as a coding block (CB). A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same. In some other example implementations for coding block partitioning, a quadtree structure may be used.

The present disclosure describes various embodiments for temporal resampling and restoration mode representation, signaling, coding, and parsing in video coding and/or decoding systems. The embodiments of this application can be applied to cloud technology, smart transportation, assisted driving, and other scenarios involving machine recognition and/or for machine consumption. In some implementations, various methods in the present disclosure may be applicable for video coding for machines (CVM).

In some implementations, the machine recognition scene may include the scene in which the machine interprets the video data and completes related tasks (such as detection, recognition, and other tasks). For example, the video perception features of the target user for video data in the user viewing scenario are different from those of the target machine in the machine recognition scenario. Therefore, the requirements for the quality and resolution of video data in the user viewing scenario are different from those in the machine recognition scenario. The encoding device can also obtain the video content features of the original video data, which may include the rate of change of the video content in the original video data, the amount of video content information, the video resolution of the video frames in the original video data, and the number of video frames played per unit time in the original video data.

In some implementations, the quality requirements of the video data may depend on media application scenario, for example, content change rate requirements and resolution requirements. In some implementations, video content characteristics of the original video data may indicate the video content change rate, and an encoding device can determine the target sampling parameters for sampling and processing the original video data according to the media application scenario and the characteristics of the video content. The sampling parameters can include the sampling mode and the sampling ratio in the sampling mode. Specifically, the target sampling mode may include whether a temporal sampling mode is enabled or not, and/or whether a spatial sampling mode is enabled or not. The temporal sampling mode refers to sampling video frames (related to frame rate), and the spatial sampling mode refers to sampling pixels/lines/blocks in each frame (related to frame resolution). For example, the sampling ratio in the temporal sampling mode may be 2 (i.e., sampling each of every other frames), or 3 (i.e., sampling each of every 3 frames); and the sampling rate in spatial sampling mode may be any value greater than 0, such as 0.5 (i.e., resolution being 0.5 times of its original resolution), or 0.75 (i.e., resolution being 0.75 times of its original resolution), or 2× (i.e., resolution being 2 times of its original resolution).

In some implementations, the sampling parameters (mode and/or ratio/rate) may be determined according to the characteristics of the video content and/or specific scenario. In some implementations, the video-perceptual features may be determined for the video data in the media application scenario, and/or based on the perceptual features of the video and the characteristics of the video content, the sampling ratio/rate under the target sampling mode is determined. The target sampling ratio/rate and target sampling method are determined as the target sampling parameters used for sampling and processing the original video data.

Figure 7:
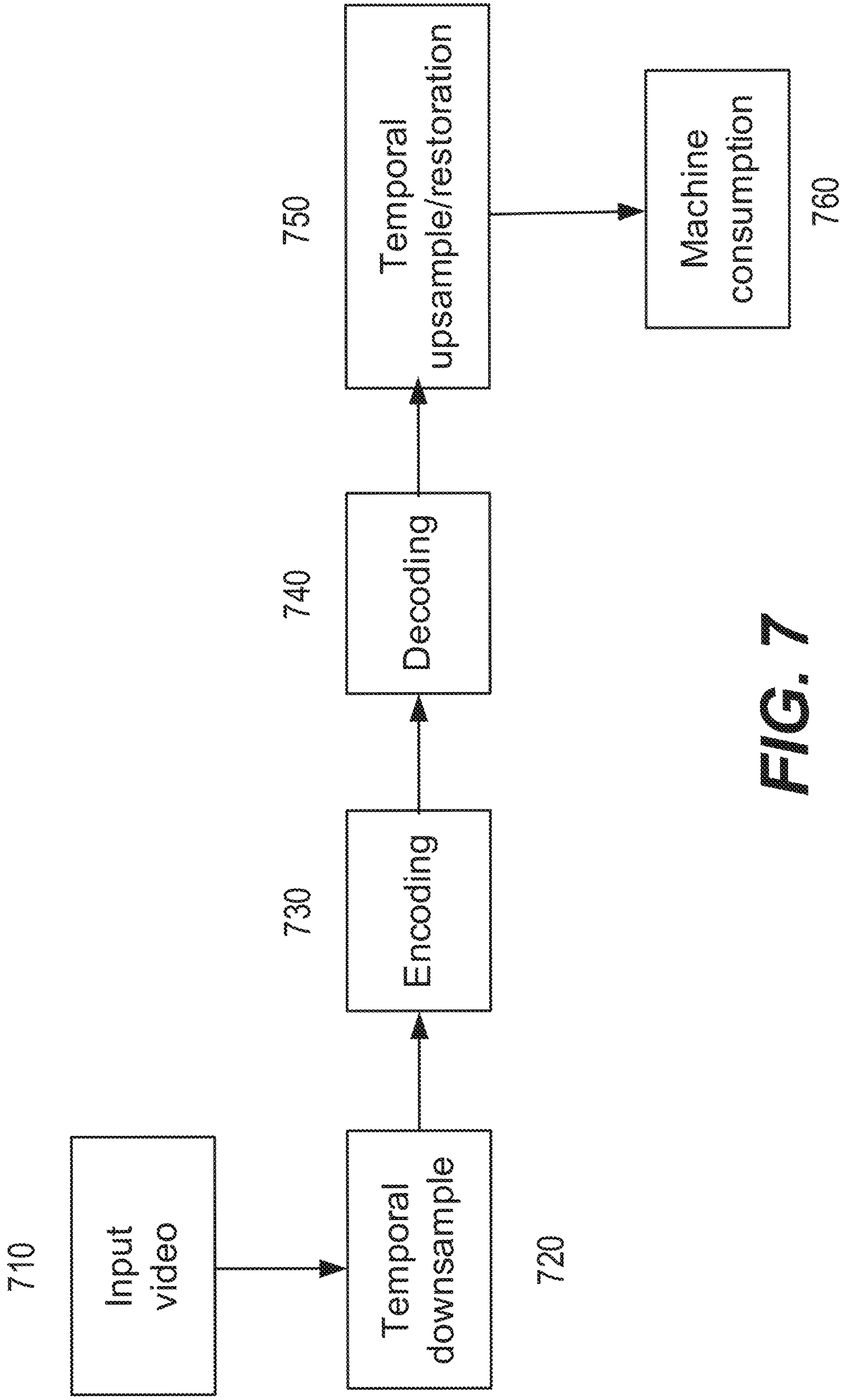
FIG. 7 shows a scheme of temporal resampling-based video compression framework according to example embodiments of the disclosure.

FIG. 7 shows an exemplary embodiment of a temporal resampling-based video data processing pipeline, which may include a portion or all of the following: temporal downsampling 720, encoding 730, decoding 740, and/or temporal upsampling/resampling (or referred as temporal restoration) 750. An input video 710 may be temporally downsampled before encoding, and then downsampled video data may be fed into the encoder to be compressed in video bitstream for transmission, storage, or other processing. In some implementations, the transmitted or retrieved compressed video bitstream is decoded for reconstructing video sequence; and the reconstructed video sequence is further temporally upsampled (e.g., to its original frame rate or a different frame rate) for further processing (e.g., for machine consumption 760). Some implementations may not include the temporal upsampling/resampling unit, wherein the reconstructed video sequence from the decoder is ready directly for application (e.g., for machine consumption).

In some implementations, an encoding device (e.g., encoder) can sample (e.g., downsample) original video data according to sampling parameters (e.g., the sampling mode and the sampling ratio) to obtain the downsampled video data. The downsampled video data is subsequently encoded to obtain the video coding data corresponding to the original video data. Thus, the data volume of the video coding data can be reduced, and the transmission efficiency of the video coding data can be improved, and the storage space of the video coding data is reduced simultaneously. In some implementations, a decoding device (e.g., decoder) can upsample the reconstructed video data, for example, with the same sampling ratio, so that a same frame rate may be achieved with upsampling/resampling.

Figure 8:
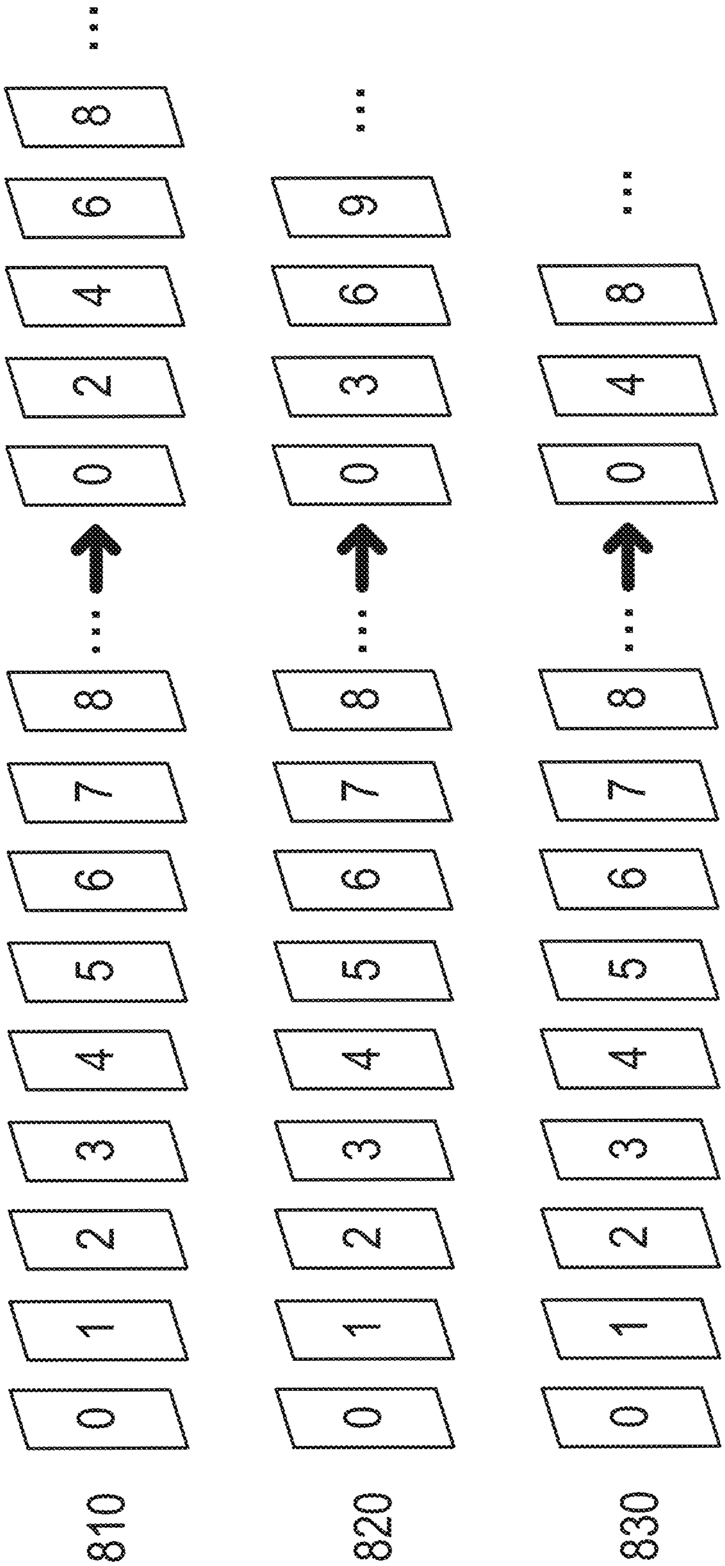
FIG. 8 shows a schematic diagram of temporal downsampling according to example embodiments of the disclosure.

FIG. 8 shows several non-limiting examples of performing temporal downsampling, wherein the original video is downsampled in temporal domain by resampling the video frames with equal interval: temporal downsampling ratios (or rates) may include 2 (810), 3 (820), or 4 (830). In some implementations, the temporal downsampling ratio (or rate) may be any positive integer larger than 1. In some other implementations, the temporal downsampling ratio (or rate) may be any positive integer including 1, wherein a value of 1 indicates there is no temporal sampling. Considering an original video with POC of {0, 1, 2, 3, 4, 5, 6, 7, 8, . . . } and the downsampling ratio being 2, the framerate is reduced to the half size of original framerate with remaining POC {0, 2, 4, 6, 8, . . . }, and the frame with POC {1, 3, 5, 7, . . . } are dropped. Considering the downsampling ratio being 3, the framerate is reduced to a third size of original framerate with remaining POC {0, 3, 6, 9, . . . }, and the frame with POC {1, 2, 4, 5, 7, 8, . . . } are dropped. Considering the downsampling ratio being 4, the framerate is reduced to a fourth size of original framerate with remaining POC {0, 4, 8, . . . }, and the frame with POC {1, 2, 3, 5, 6, 7, . . . } are dropped.

The information about the temporal sampling mode and/or the temporal sampling ratio is contained in the video bitstream and signaled to the decoder for upsampling/resampling (restoration). When the information signed in the bitstream indicates that the decoded video has been downsampled in temporal domain, a decoder is configured to perform the temporal upsampling/resampling after the video is reconstructed to recover the original frame rate.

Figure 9:
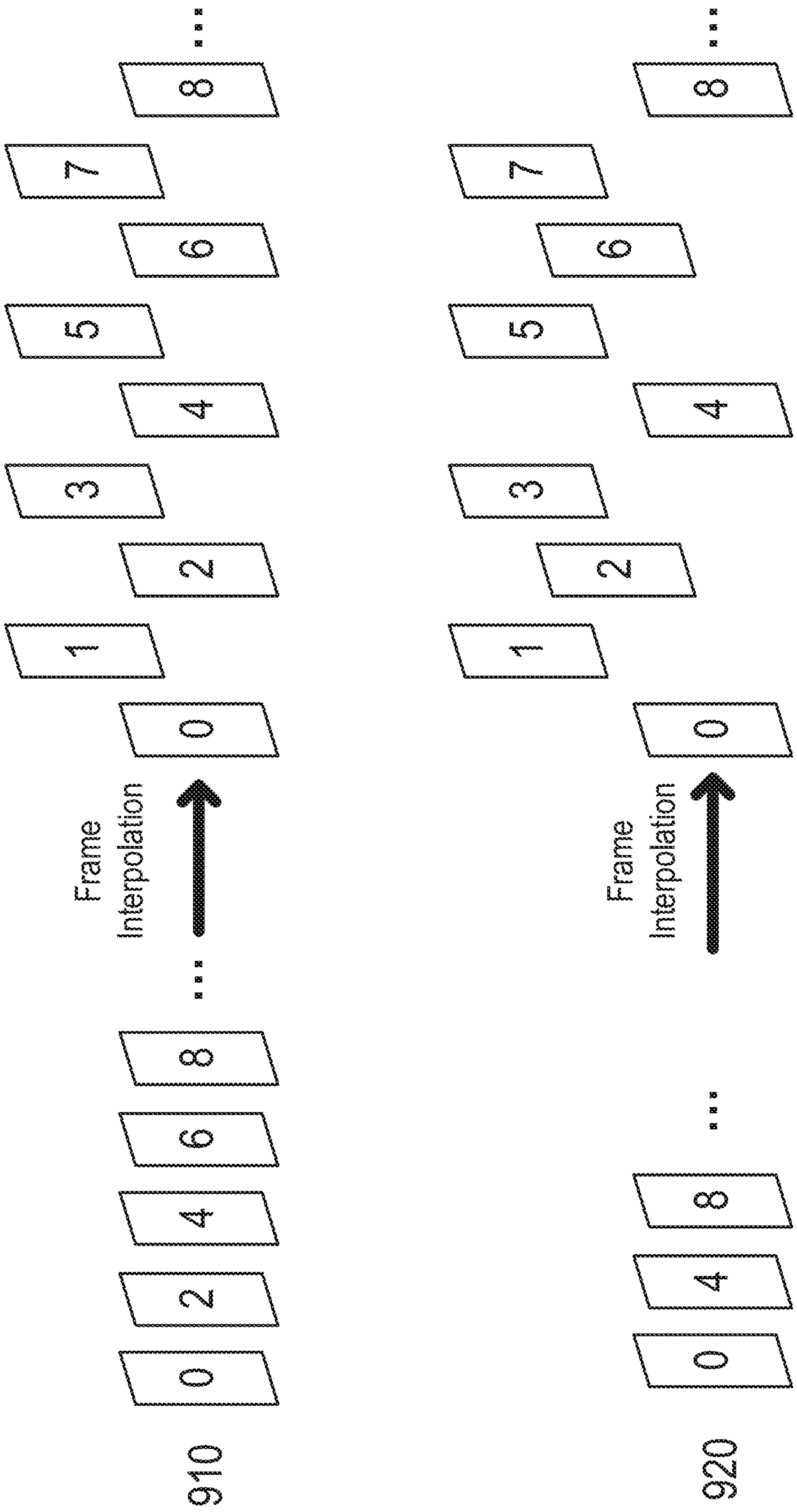
FIG. 9 shows a schematic diagram of temporal upsampling (or resampling) according to example embodiments of the disclosure.

FIG. 9 shows several non-limiting examples of performing temporal upsampling/resampling, wherein the upsampling/resampling may be performed by frame interpolation according to temporal upsampling/resampling ratios (or rates), which is equal to temporal downsampling ratios (rates) including 2 (910), or 4 (920). In some implementations, the temporal upsampling/resampling ratio (rate) may be different from the temporal downsampling ratio (rate). For example, in the 2× resampling ratio case, the dropped frames are interpolated by the previous and the following frames. For 4× resampling ratio, the dropped frames may be interpolated based on the already decoded previous and the following frames, or may be interpolated in a hierarchical way. For one example, the frames of POC 1-3 are interpolated by POC 0 and POC 4. For another example, at the first step the POC 2 frame is generated by POC 0 and POC 4, and then the frames of POC 1 and POC 3 are interpolated by the generated POC 2 and POC 0 and POC 4 subsequently. In some implementations, when the frame number of the interpolated video is smaller than the original frame number obtained from the bitstream, this temporal upsampling/resampling module duplicates the last frame to match the original frame rate.

Various embodiments and/or implementations described in the present disclosure may be performed separately or combined in any order, and may be applicable for decoding, encoding, or bitstream (or bit streaming). Further, each of the methods (or embodiments), encoder, and decoder may be implemented by processing circuitry (e.g., one or more processors or one or more integrated circuits). The one or more processors execute a program that is stored in a non-transitory computer-readable medium.

The present disclosure describes various embodiments including methods to signal, code, deliver and/or parse temporal resampling and restoration modes and related information including enabling flag, resampling ratio, etc. in video coding and/or decoding systems. Various embodiments in the present disclosure may be used for not only human but also machine consumptions, for example for Video Coding for Machines (VCM) scenarios as well as in general video coding/decoding systems.

Figure 10:
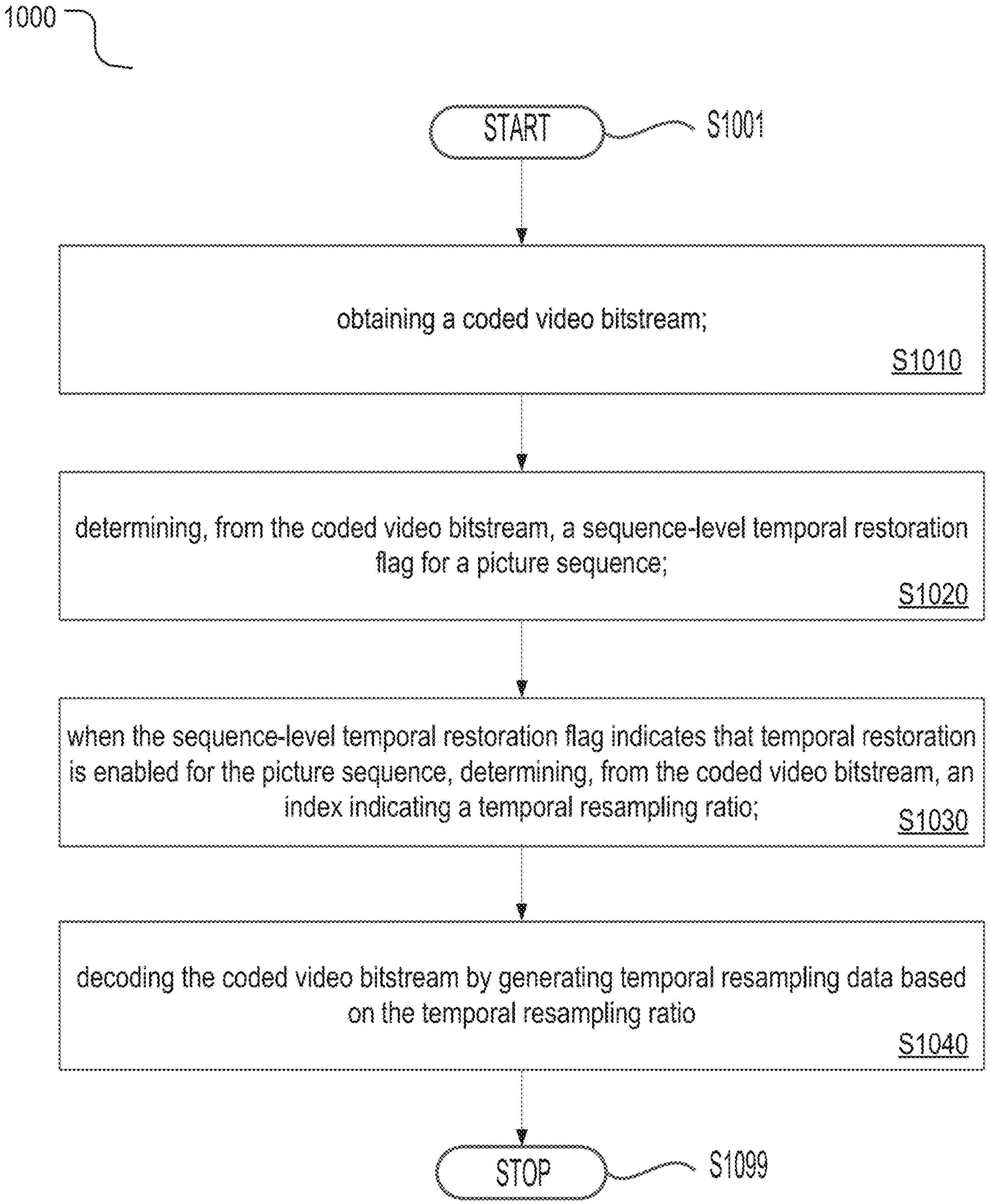
FIG. 10 shows an example logic flow for a method in the present disclosure.

FIG. 10 shows a flow chart of a method 1000 of an exemplary method following the principles underlying the implementations above. The exemplary decoding method flow starts at 1001, and may include a portion or all of the following steps: S1010, obtaining a coded video bitstream; S1020, determining, from the coded video bitstream, a sequence-level temporal restoration flag for a picture sequence; S1030, when the sequence-level temporal restoration flag indicates that temporal restoration is enabled for the picture sequence, determining, from the coded video bitstream, an index indicating a temporal resampling ratio; and/or S1040, decoding the coded video bitstream by generating temporal resampling data based on the temporal resampling ratio. The example method stops at S1099. The method 1000 may be preformed by a device comprising a memory storing instructions and a processor in communication with the memory.

In some implementations, in addition to any portion or combination of the embodiments and/or implementations in the present disclosure, the temporal resampling ratio is indicated by the index by: being equal to 2^(M+1), wherein M is an unsigned integer value of the index.

In some implementations, in addition to any portion or combination of the embodiments and/or implementations in the present disclosure, the method 1000 may further include determining, by the device from the coded video bitstream, a temporal-remaining number indicating a number of pictures that are output after a last temporal resampling picture in the picture sequence.

In some implementations, in addition to any portion or combination of the embodiments and/or implementations in the present disclosure, the temporal-remaining number is an integer from 0 to the temporal resampling ratio.

In some implementations, in addition to any portion or combination of the embodiments and/or implementations in the present disclosure, the method 1000 may further include determining, by the device from the coded video bitstream, a picture-level temporal restoration flag for a current picture in the picture sequence; and when the picture-level temporal restoration flag indicates that temporal restoration is enabled for the current picture: determining, by the device from the coded video bitstream, a picture-level index indicating a picture-level temporal resampling ratio, and decoding, by the device, the coded video bitstream by generating picture-level temporal resampling data for the current picture based on the picture-level temporal resampling ratio.

In some implementations, in addition to any portion or combination of the embodiments and/or implementations in the present disclosure, the method 1000 may further include when the picture-level temporal restoration flag indicates that temporal restoration is disabled for the current picture, decoding, by the device, the coded video bitstream by generating sequence-level temporal resampling data for the picture sequence based on the temporal resampling ratio.

In some implementations, in addition to any portion or combination of the embodiments and/or implementations in the present disclosure, when the sequence-level temporal restoration flag indicates that temporal restoration is enabled for the picture sequence, the method 1000 further comprises: determining, by the device from the coded video bitstream, a picture-level temporal restoration flag for a current picture in the picture sequence; and when the picture-level temporal restoration flag indicates that temporal restoration is enabled for the current picture: determining, by the device from the coded video bitstream, a picture-level index indicating a picture-level temporal resampling ratio, and decoding, by the device, the coded video bitstream by generating picture-level temporal resampling data for the current picture based on the picture-level temporal resampling ratio.

In some implementations, in addition to any portion or combination of the embodiments and/or implementations in the present disclosure, the method 1000 may further include when the picture-level temporal restoration flag indicates that temporal restoration is disabled for the current picture, decoding, by the device, the coded video bitstream by generating sequence-level temporal resampling data for the picture sequence based on the temporal resampling ratio.

In some implementations, in addition to any portion or combination of the embodiments and/or implementations in the present disclosure, when the sequence-level temporal restoration flag indicates that temporal restoration is enabled for the picture sequence, the method further comprises: determining, by the device from the coded video bitstream, a picture-level temporal restoration flag for a current picture in the picture sequence; and decoding, by the device, the coded video bitstream by generating sequence-level temporal resampling data for the picture sequence based on the temporal resampling ratio.

Figure 11:
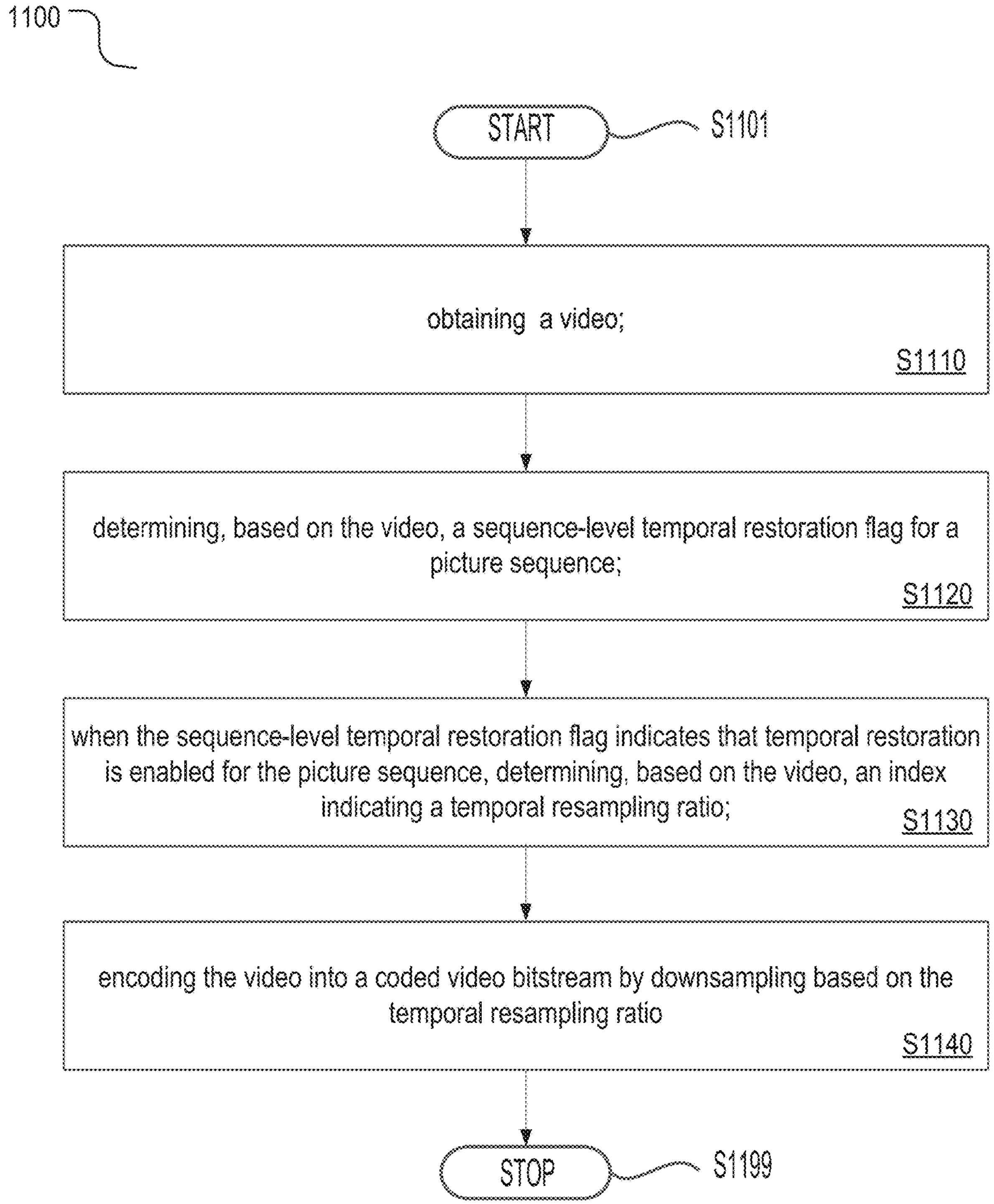
FIG. 11 shows an example logic flow for another method in the present disclosure.

FIG. 11 shows a flow chart of an exemplary method 1100 following the principles underlying the implementations above. The exemplary encoding method flow starts at 1101, and may include a portion or all of the following steps: S1110, obtaining a video; S1120, determining, based on the video, a sequence-level temporal restoration flag for a picture sequence; S1130, when the sequence-level temporal restoration flag indicates that temporal restoration is enabled for the picture sequence, determining, based on the video, an index indicating a temporal resampling ratio; and/or S1140, encoding the video into a coded video bitstream by downsampling based on the temporal resampling ratio. The example method stops at S1199. The method 1100 may be performed by a device comprising a memory storing instructions and a processor in communication with the memory.

In some implementations, in addition to any portion or combination of the embodiments and/or implementations in the present disclosure, the temporal resampling ratio is indicated by the index by: being equal to 2^(M+1), wherein M is an unsigned integer value of the index.

In some implementations, in addition to any portion or combination of the embodiments and/or implementations in the present disclosure, the method 1100 may further include determining, by the device based on the video, a temporal-remaining number indicating a number of pictures after a last temporal downsampling picture in the picture sequence.

In some implementations, in addition to any portion or combination of the embodiments and/or implementations in the present disclosure, the temporal-remaining number is an integer from 0 to the temporal resampling ratio.

In some implementations, in addition to any portion or combination of the embodiments and/or implementations in the present disclosure, the method 1100 may further include determining, by the device based on the video, a picture-level temporal restoration flag for a current picture in the picture sequence; and when the picture-level temporal restoration flag indicates that temporal restoration is enabled for the current picture: determining, by the device based on the video, a picture-level index indicating a picture-level temporal resampling ratio, and encoding, by the device, the video into the coded video bitstream by picture-level downsampling the current picture based on the picture-level temporal resampling ratio.

In some implementations, in addition to any portion or combination of the embodiments and/or implementations in the present disclosure, the method 1100 may further include when the picture-level temporal restoration flag indicates that temporal restoration is disabled for the current picture, encoding, by the device, the video into the coded video bitstream by sequence-level downsampling the picture sequence based on the temporal resampling ratio.

In some implementations, in addition to any portion or combination of the embodiments and/or implementations in the present disclosure, when the sequence-level temporal restoration flag indicates that temporal restoration is enabled for the picture sequence, the method further comprises: determining, by the device based on the video, a picture-level temporal restoration flag for a current picture in the picture sequence; and when the picture-level temporal restoration flag indicates that temporal restoration is enabled for the current picture: determining, by the device based on the video, a picture-level index indicating a picture-level temporal resampling ratio, and encoding, by the device, the video into the coded video bitstream by picture-level downsampling the current picture based on the picture-level temporal resampling ratio.

In some implementations, in addition to any portion or combination of the embodiments and/or implementations in the present disclosure, the method 1100 may further include when the picture-level temporal restoration flag indicates that temporal restoration is disabled for the current picture, encoding, by the device, the video into the coded video bitstream by sequence-level downsampling the picture sequence based on the temporal resampling ratio.

In some implementations, in addition to any portion or combination of the embodiments and/or implementations in the present disclosure, when the sequence-level temporal restoration flag indicates that temporal restoration is enabled for the picture sequence, the method further comprises: determining, by the device based on the video, a picture-level temporal restoration flag for a current picture in the picture sequence; and encoding, by the device, the video into the coded video bitstream by sequence-level downsampling the picture sequence based on the temporal resampling ratio.

In various embodiment in the present disclosure, a non-transient computer-readable storage medium stores an encoded bitstream of a video, the encoded bitstream comprising: a sequence-level temporal restoration flag for a picture sequence; and when the sequence-level temporal restoration flag indicates that temporal restoration is enabled for the picture sequence, an index indicating a temporal resampling ratio, so that the encoded bitstream is configured to be decoded by generating temporal resampling data based on the temporal resampling ratio.

In some implementations, in addition to any portion or combination of the embodiments and/or implementations in the present disclosure, the temporal resampling ratio is indicated by the index by: being equal to 2^(M+1), wherein M is an unsigned integer value of the index.

In various embodiments in the present disclosure, whether a temporal restoration is enabled (applied) may refer to whether the decoder (or encoder) need to upsample/resample (or downsample, respectively) the received video frames, as described in various embodiments and/or implementations in the present disclosure.

In various embodiments in the present disclosure, a "picture" may refer to a "frame", or vise versa. A "picture-level" may refer to as "frame-level." A "picture sequence" may refer to as "frame sequence" or simply as "sequence".

In various embodiments in the present disclosure, a temporal resampling ratio may refer to a portion or all of the following: a temporal upsampling/resampling ratio (rate), a temporal downsampling ratio (or rate), and/or a temporal sampling ratio (rate), as described in various embodiments and/or implementations in the present disclosure. In some implementations, the temporal resampling ratio is an integer larger than 1.

In various embodiments in the present disclosure, a temporal restoration mode may refer to a portion or all of the following: temporal sampling information, temporal downsampling information, and/or temporal resampling information, as described in various embodiments and/or implementations in the present disclosure. For example, the temporal restoration model may include whether the temporal restoration is enabled (applied) or disabled (not applied), and the temporal resampling ratio when the temporal restoration is enabled (applied). For example, one temporal restoration mode may include that the temporal restoration is disabled (not applied); another temporal restoration mode may include that the temporal restoration is enabled (applied) and the temporal resampling ratio is 4.

In some implementations, in addition to any portion or combination of the embodiments and/or implementations in the present disclosure, the method may include reconstructing the reconstructed frames based on the coded video bitstream; and/or the method may include outputting the restored frames for machine consumption.

In some implementations: one example of syntax table and semantics is shown below.

| | Descriptor |
|---|---|
| sequence_level_temporal_restoration_data( ) { | |
| sequence_level_temporal_restoration_flag | u(1) |
| if(sequence_level_temporal_restoration_flag ) { | |
| sequence_level_temporal_resampling_ratio_idx | u(2) |
| } | |
| byte_alignment( ) | |
| } | |

Wherein the sequence_level_temporal_restoration_flag may be used as a sequence-level temporal restoration flag, the sequence_level_temporal_resampling_ratio_idx may be used as a sequence-level index indicating a sequence-level temporal resampling ratio, or simply as an index indicating a temporal resampling ratio. In some implementations, the sequence-level index may be used to derive a global resampling ratio. In some implementations, the sequence-level index may be 0, 1, and/or 2.

In some implementations, another example of syntax table and semantics is shown below.

| | Descriptor |
|---|---|
| picture_level_temporal_restoration_data( ) { | |
| if( sequence_level_temporal_restoration_flag ) { | |
| picture_level_temporal_resampling_ratio_changed_flag | u(1) |
| if(picture_level_temporal_resampling_ratio_changed_flag ) { | |
| picture_level_temporal_resampling_ratio_idx | u(2) |
| } | |
| } | |
| } | |

Wherein the picture_level_temporal_resampling_ratio_changed_flag may be used as a picture-level temporal restoration flag; and a picture_level_temporal_resampling_ratio_idx may be used as a picture-level index indicating a picture-level temporal resampling ratio. In some implementations, the picture-level temporal restoration flag may be used to specify whether the temporal resampling ratio for the current picture is changed, wherein the change may include at least one of the following: a temporal resampling ratio for the current picture, a temporal resampling mode for the current picture, or any other temporal resampling parameters for the current picture.

In some implementations, another example of syntax table is shown below.

| | Descriptor |
|---|---|
| picture_level_temporal_restoration_data( ) { | |
| picture_level_temporal_resampling_ratio_changed_flag | u(1) |
| if(picture_level_temporal_resampling_ratio_changed_flag ) { | |
| picture_level_temporal_resampling_ratio_idx | u(2) |
| } | |
| } | |

In various embodiment in the present disclosure, a reconstructed pivot frame is a key frame that has been encoded, transmitted, and then decoded at the receiver's end. Initially selected based on their even temporal distribution and controlled by a temporal_resampling_ratio, these frames undergo compression to reduce data size for storage and transmission. Upon reception, these pivot frames are decoded to serve as the foundational reference points for interpolating the intervening non-key frames.

The present disclosure describes various exemplary embodiments, which merely serve as examples and do not pose limitations. Any portion, step, and/or operation in one same embodiment/implementation or more than one different embodiments/implementation in the present disclosure may be combined or arranged in any amount or order, as desired. Two or more of the steps and/or operations may be performed in parallel. Embodiments and implementations in the disclosure may be used separately or combined in any order. Further, each of the methods (or embodiments) may be implemented by processing circuitry (e.g., one or more processors or one or more integrated circuits).

Embodiment Set I

In various embodiments, the signaling may be on a sequence level. In some embodiments, information is signaled that specifies temporal_resampling_ratio. This information indicates the number of frames that need to be inserted between every two reconstructed pivot frames. This information may not be directly represented; it could be other data from which the information can be derived. In some implementations, variable-length coding is utilized to transmit information of temporal_restoration_ratio_idx. The variable-length is included but not limited to unary, truncated unary, binary, truncated binary coding, etc. One exemplary syntax table is shown as below.

| | Descriptor |
|---|---|
| temporal_restoration_data_per_sequence ( ) { | |
| temporal_restoration_flag | u(1) |
| if( temporal_restoration_flag ) { | |
| temporal_restoration_ratio_idx | u(n)/u(v)/ue(v)/ . . . |
| } | |
| byte_alignment( ) | |
| } | |

For a non-limiting example, the restoration ratios could be 2, 4, and 8. The encoding may include: the restoration ratio of 2 is encoded as binary 0, the restoration ratio of 4 is encoded as binary 10, the restoration ratio of 8 is encoded as binary 11. Decoding is terminated when a 0 is encountered or when the maximum read length of two bits is reached.

In some embodiments, information is signaled that indicates the total number of frames in the sequence that to be restored. The decoding process relies on this information to determine how many frames need to be interpolated. This information may not directly represent the frame count; it could be other data from which the necessary frame count can be derived.

In some implementations, the total_number_frames_in_sequence syntax is signaled. This syntax can be signalled as unary, truncated unary, binary, truncated binary, fixed length or other coding. One exemplary syntax table is shown below.

| | Descriptor |
|---|---|
| temporal_restoration_data_per_sequence ( ) { | |
| temporal_restoration_flag | u(1) |
| if( temporal_restoration_flag ) { | |
| temporal_resampling_ratio_idx | u(n)/u(v)/ue(v)/ . . . |
| total_number_frames_in_sequence | u(n)/u(v)/ue(v)/ . . . |
| } | |
| byte_alignment( ) | |
| } | |

For example, the source video has 10 frames and the scaling factor is 4, resulting in 3 reconstructed pivot frame. The total_number_frames_in_sequence parameter, which is set to 10, is passed to the decoder. Given these 3 reconstructed pivot frames and the scaling factor of 4, decoder is capable of reconstructing sequences with different frame counts, specifically sequences with 9, 10, 11, or 12 frames. Therefore, the total number of frames in the sequence is crucial for the decoding process to accurately estimate and reconstruct the video.

In some implementations, the number of frames that need to be restored is signaled. This syntax can be signalled as unary, truncated unary, binary, truncated binary, fixed length or other coding. total_number_frames_in_sequence can be derived by the following equation:

total_number_frames_in_sequence = number_of_frames_to_be_restored + number_of_rec_pivot_frames.

One exemplary syntax table is shown below.

| | Descriptor |
|---|---|
| temporal_restoration_data_per_sequence ( ) { | |
| temporal_restoration_flag | u(1) |
| if( temporal_restoration_flag ) { | |
| temporal_resampling_ratio_idx | u(n)/u(v)/ue(v)/ . . . |
| number_of_frames_to_be_restored | u(n)/u(v)/ue(v)/ . . . |
| } | |
| byte_alignment( ) | |
| } | |

For example, the source video has 10 frames and the scaling factor is 4, resulting in 3 reconstructed pivot frame. The number_of_frames_to_be_restored parameter, which is set to 7, is passed to the decoder.

In some implementations, the number of frames to be restored following the last reconstructed pivot frame is signaled. This syntax can be signalled as unary, truncated unary, binary, truncated binary, fixed length or other coding. Total_number_frames_in_sequence can be derived by the following equation: Total_number_frames_in_sequence=(num_reconstructed pivot frame−1)*scale_factor+1+frames_to_restored_after_last_ref.

One possible syntax table is shown below.

| | Descriptor |
|---|---|
| temporal_restoration_data_per_sequence( ) { | |
| temporal_restoration_flag | u(1) |
| if( temporal_restoration_flag ) { | |
| temporal_resampling_ratio_idx | u(n)/u(v)/ue(v)/ . . . |
| tail_frames_to_be_restored | u(n)/u(v)/ue(v)/ . . . |
| } | |
| byte_alignment( ) | |
| } | |

For example, the source video has 10 frames and the scaling factor is 4, resulting in 3 reconstructed pivot frame. The frames_to_restored_after_last_ref parameter, which is set to 1, is passed to the decoder. The bit length for frames_to_restored_after_last_ref is determined by the logarithm of the scale factor. For example, if the resample rate is 4, then the possible values for frames_to_restored_after_last_ref are 0, 1, 2, and 3. Consequently, 2 bits are sufficient to represent these values.

One example of syntax table and semantics are shown below:

| | Descriptor |
|---|---|
| temporal_restoration_data_per_sequence( ) { | |
| temporal_restoration_flag | u(1) |
| if( temporal_restoration_flag ) { | |
| temporal_resampling_ratio_idx | u(2) |
| tail_frames_to_be_restored | u(4) |
| } | |
| byte_alignment( ) | |
| } | |

In some implementations, temporal_restoration_flag equal to 1 specifies that temporal restoration is enabled. temporal_restoration_flag equal to 0 specifies that temporal restoration is disabled; and temporal_resampling_ratio_idx specifies the temporal resampling scaling factor when temporal restoration is enabled. The variable TemporalResamplingRatio is derived as follows: TemporalResamplingRatio=2^(temporal_resampling_ratio_idx+1). In some implementations, tail_frames_to_be_restored specifies the number of frames that need to be restored after the last frame. The variable TotalNumberOfFrames is derived as follows:

$$TotalNumberOfFrames = (NumPivotFrames - 1) \times TemporalResamplingRatio + 1 + \text{tail\_frames\_to\_be\_restored}.$$

In some embodiments, information is signaled related to stream sequence. An exemplary syntax table is shown below.

| | Descriptor |
|---|---|
| temporal_restoration_data_per_sequence( ) { | |
| temporal_restoration_flag | u(1) |
| if( temporal_restoration_flag ) { | |
| temporal_resampling_ratio_idx | u(n)/u(v)/ue(v)/ . . . |
| stream_flag | u(1) |
| if (stream_flag) { | |
| stream_related_information | u(n)/u(v)/ue(v)/ . . . |
| }else{ | |
| total_number_frames_in_sequence | u(n)/u(v)/ue(v)/ . . . |
| } | |
| } | |
| byte_alignment( ) | |
| } | |

In one embodiment, a flag is signaled indicating whether the sequence is a stream. If it is a stream, the temporal restoration operation regarding to stream is processed. Note, total_number_frames_in_sequence is only signaled when stream_flag is off.

In some embodiments, the signaling may be on a frame level. In some implementations, a signal indicates whether the temporal restoration module is activated. If activated, the module performs restoration according to the specified restoration ratio. The restoration ratio indicates the number of frames that need to be restored between the current reconstructed pivot frame and the previous reconstructed pivot frame. For example, if temporal_resampling_ratio is 4, three frames are restored between the reconstructed pivot frame and the previous one. A value of 1 for the flag indicates that temporal restoration is enabled, while a value of 0 indicates that it is disabled. Note that the binary values 0 and 1 in these codewords can be reversed. The corresponding syntax for this process is detailed in the table below.

| | Descriptor |
|---|---|
| temporal_restoration_data_per_frame( ) { | |
| temporal_restoration_flag | u(1) |
| if( temporal_restoration_flag ) { | |
| temporal_resampling_ratio_idx | u(n)/u(v)/ue(v)/ . . . |
| } | |
| byte_alignment( ) | |
| } | |

In some implementations, the flag can be signaled at different frame levels, it includes (but not limited to) picture parameter set (PPS), slice header, picture header, supplemental enhancement information (SEI). In some implementations, the on/off status is signaled alongside temporal_resampling_ratio. For example, if the temporal restoration factor is set to 0, it indicates that temporal restoration is disabled. Otherwise, number of frames are restored between the decoded reconstructed pivot frame and the previous one.

The corresponding syntax is detailed in the table below.

| | Descriptor |
|---|---|
| temporal_restoration_data_per_frame( ) { | |
| temporal_resampling_ratio_idx | u(n)/u(v)/ue(v)/ . . . |
| byte_alignment( ) | |
| } | |

Embodiment Set II

In various embodiments, signaling may be on both a sequence level and a frame level (or a picture level). In some embodiments, seq_temporal_restoration_flag is signalled to indicate whether sequence level signaling is enabled. The flag can be signalled in any of parameters sets such as video parameter set (VPS), sequence parameter set (SPS), etc. as well as in the sequencer level temporal_restoration_data syntax set. This flag indicates whether the temporal restoration is enabled or not. When it is enabled another frame/slice/picture level flag, frame_temporal_restoration_flag, is signalled to specify whether frame/slice/picture restoration is used or not. When frame_temporal_restoration_flag is signalled as 1, frame/slice/picture level information related to temporal restoration in signalled in the bitstream and this information is used to perform the temporal restoration. When frame_temporal_restoration_flag is signalled as 0 the syntax level information is signalled and used to not to perform the temporal restoration.

Some exemplary syntax tables are shown below.

| | Descriptor |
|---|---|
| temporal_restoration_data_per_sequence( ) { | |
| seq_temporal_restoration_flag | u(1) |
| if( seq_temporal_restoration_flag ) { | |
| frame_ temporal_restoration_flag | u(1) |
| if (!frame_temporal_restoration_flag) { | |
| seq_level_temporal_restoration_data ( ) | |
| } | |
| } | |
| byte_alignment( ) | |
| } | |

| | Descriptor |
|---|---|
| seq_level_temporal_restoration_data ( ) { | |
| tail_frames_to_be_restored | u(n)/u(v)/ue(v)/ . . . |
| seq_temporal_resampling_ratio_idx | u(n)/u(v)/ue(v)/ . . . |
| } | |

In some implementations, a frame/slice/picture level signalling is shown below.

| | Descriptor |
|---|---|
| temporal_restoration_data_per_frame( ) { | |
| if(frame_temporal_restoration_flag) { | u(1) |
| frame_temporal_resampling_ratios_idx | u(n)/u(v)/ue(v)/ . . . |
| } | |
| byte_alignment( ) | |
| } | |

In some implementations, if a sequence has a constant resample ratio, seq_temporal_restoration_flag is enabled and frame_temporal_restoration_flag is disabled. seq_temporal_resampling_ratio_idx is used to indicate the index of the resample ratio as SeqTemporalResamplingRatio=2^(seq_temporal_resampling_ratio_idx+1).

In some implementations, if a sequence has different resample ratios for different segments, frame level signaling is enabled and frame_temporal_resampling_ratio_idx is used to indicate the index of the resample ratio as FrameTemporalResamplingRatio=2^(frame_temporal_resampling_ratio_idx+1) or =2^frame_temporal_resampling_ratio_idx.

In some embodiments, the seq_level_temporal_restoration_data is always signalled at the sequence level regardless of the value of frame_temporal_restoration_flag. One exemplary syntax table is shown below.

| | Descriptor |
|---|---|
| temporal_restoration_data_per_sequence( ) { | |
| seq_temporal_restoration_flag | u(1) |
| if( seq_temporal_restoration_flag ) { | |
| frame_ temporal_restoration_flag | u(1) |
| seq_level_temporal_restoration_data ( ) | |
| } | |
| byte_alignment( ) | |
| } | |

In some implementations, when frame_temporal_restoration_flag is enabled, frame/slice/picture level information is used to calculate the resample ratio, otherwise the sequence level information is used.

In some embodiments, the seq_level_temporal_restoration_data is signalled depending on a high level flag, seq_temporal_restoration_presence_flag. A syntax table is shown below.

| | Descriptor |
|---|---|
| temporal_restoration_data_per_sequence( ) { | |
| seq_temporal_restoration_flag | u(1) |
| if( seq_temporal_restoration_flag ) { | |
| seq_temporal_restoration_presence_flag | u(1) |
| if (seq_temporal_restoration_presence_flag) | |
| seq_level_temporal_restoration_data ( ) | u(1) |
| frame_ temporal_restoration_flag | u(1) |
| } | |

-continued

| | Descriptor |
|---|---|
| byte_alignment( ) | |
| } | |

In some implementations, when frame_temporal_restoration_flag is enabled, frame/slice/picture level information is used to calculate the resample ratio, otherwise the sequence level information is used. In some implementations, the frame_temporal_restoration_flag may be inferred to 1 if not present.

Embodiment Set III

In various embodiments in the present disclosure, signaling may be on both a sequence level and a frame level (or a picture level). Sequence level signaling can be done at different places, such as SPS, PPS, VUI, and SL) Picture level signaling can be done at frame level, such as picture header, slice header.

In some embodiments, the temporal resampling module performs interpolation such that between every two reconstructed pivot frames requiring interpolation, the process is always conducted in a backward direction based on the information (such as TemporalResamplingRatio) from the later reconstructed pivot frame. In some implementations, sequence-level information is signaled at SPS; and/or picture-level information is signaled at picture header. An exemplary syntax table at sequence level is shown below.

| | Descriptor |
|---|---|
| seq_parameter_set_rbsp( ) { | |
| ... | |
| sps_extension_flag | u(1) |
| if( sps_extension_flag ){ | |
| sps_range_extension_flag | u(1) |
| sps_vcm_extension_flag | u(1) |
| sps_extension_6bits | u(6) |
| if( sps_range_extension_flag ) | |
| sps_range_extension( ) | |
| if( sps_vcm_extension_flag ) | |
| sps_temporal_restoration_enabled_flag | u(1) |
| if(sps_temporal_restoration_enabled_flag) | |
| sps_temporal_restoration_ratio_index | u(n)/u(v)/ue(v)/ . . . |
| } | |
| if( sps_extension_6bits ){ | |
| while( more_rbsp_data( ) ) | |
| sps_extension_data_flag | u(1) |
| } | |
| rbsp_trailing_bits( ) | |
| } | |

In some implementations, an exemplary picture header structure syntax is shown below.

| | Descriptor |
|---|---|
| picture_header_structure( ) { | |
| ... | |
| if( pps_picture_header_extension_present_flag ) { | |
| ph_extension_length | ue(v) |
| temporal_restoration_data( ) | |
| ph_extension_length2 | |
| for( i = 0; i < ph_extension_length2; i++) | |
| ph_extension_data_byte[ i ] | u(8) |
| } | |
| } | |

| | Descriptor |
|---|---|
| temporal_restoration_data( ) { | |
| if(sps_temporal_restoration_enabled_flag) { | |
| ph_temporal_resampling_ratio_changed_flag | u(1) |
| if(ph_temporal_resampling_ratio_changed_flag) | |
| ph_temporal_resampling_ratio_idx | u(n)/u(v)/ue(v)/ . . . |
| } | |
| byte_alignment( ) | |
| } | |

In some implementations, an exemplary end of bitstream RBSP syntax is shown below.

| | Descriptor |
|---|---|
| end_of_bitstream_rbsp( ) { | |
| if(sps_temporal_restoration_enabled_flag ) | |
| eob_num_temporal_remain | u(n)/u(v)/ue(v)/ . . . |
| ... | |
| } | |

In some implementations, sps_temporal_restoration_enabled_flag equal to 1 specifies that the temporal restoration ratio at the decoder: TemporalResamplingRatio=$2^{sps\_temporal\_restoration\_ratio\_index+1}$ or $=2^{sps\_temporal\_restoration\_ratio\_index}$.

In some implementations, ph_temporal_resampling_ratio_changed_flag equal to 1 specifies that the temporal restoration is with the changed temporal resampling ratio, TemporalResamplingRatio. ph_temporal_resampling_ratio_changed_flag equal to 0 specifies that the temporal restoration is with the decoder temporal resampling ratio, TemporalResamplingRatio.

In some implementations, ph_temporal_resampling_ratio_idx specifies the temporal resampling scaling factor when sps_temporal_restoration_enabled_flag is enabled and ph_temporal_resampling_ratio_changed_flag is active. In some implementations, the variable TemporalResamplingRatio is derived as follows: TemporalResampling Ratio $2^{ph\_temporal\_resampling\_ratio\_idx}$ or $=2^{ph\_temporal\_resampling\_ratio\_idx+1}$.

In some implementations, eob_num_temporal_remain specifies the number of frames that need to be restored after the last frame. The variable TotalNumberOfFrames is derived as follows:

$$TotalNumberOfFrames = \text{eob\_num\_temporal\_remain} + 1 + \sum_{i=0}^{N-2} TemporalResamplingRatio[i],$$

wherein TemporalResamplingRatio[i] specifies the temporal resampling ratio between the i-th and the (i+1)-th input picture.

In some embodiments, sps_temporal_restoration_overwrite_flag may be at sequence level. An exemplary syntax table at sequence level is shown below.

| | Descriptor |
|---|---|
| seq_parameter_set_rbsp( ) { | |
| ... | |
| sps_extension_flag | u(1) |
| if( sps_extension_flag ){ | |
| sps_range_extension_flag | u(1) |
| sps_vcm_extension_flag | u(1) |
| sps_extension_6bits | u(6) |
| if( sps_range_extension_flag ) | |
| sps_range_extension( ) | |
| if( sps_vcm_extension_flag ) | |
| sps_temporal_restoration_enabled_flag | u(1) |
| if(sps_temporal_restoration_enabled_flag) | |
| sps_temporal_restoration_overwrite_flag | u(1) |
| sps_temporal_restoration_ratio_index | u(n)/u(v)/ue(v)/ . . . |
| } | |
| if( sps_extension_6bits ){ | |
| while( more_rbsp_data( ) ) | |
| sps_extension_data_flag | u(1) |
| } | |
| rbsp_trailing_bits( ) | |
| } | |

In some implementations, sps_temporal_restoration_ratio_index may be signaled only if sps_temporal_restoration_overwrite_flag is false.

| | Descriptor |
|---|---|
| seq_parameter_set_rbsp( ) { | |
| ... | |
| sps_extension_flag | u(1) |
| if( sps_extension_flag ){ | |
| sps_range_extension_flag | u(1) |
| sps_vcm_extension_flag | u(1) |
| sps_extension_6bits | u(6) |
| if( sps_range_extension_flag ) | |
| sps_range_extension( ) | |
| if( sps_vcm_extension_flag ) | |
| sps_temporal_restoration_enabled_flag | u(1) |
| if(sps_temporal_restoration_enabled_flag) | |
| sps_temporal_restoration_overwrite_flag | u(1) |
| if(!sps_temporal_restoration_overwrite_flag) | |
| sps_temporal_restoration_ratio_index | u(n)/u(v)/ue(v)/ . . . |
| } | |
| if( sps_extension_6bits ){ | |
| while( more_rbsp_data( ) ) | |
| sps_extension_data_flag | u(1) |
| } | |
| rbsp_trailing_bits( ) | |
| } | |

In some implementations, an exemplary picture header structure syntax is shown below.

| | Descriptor |
|---|---|
| picture_header_structure( ) { | |
| ... | |
| if( pps_picture_header_extension_present_flag ) { | |
| ph_extension_length | ue(v) |
| temporal_restoration_data( ) | |
| ph_extension_length2 | |
| for( i = 0; i < ph_extension_length2; i++) | |
| ph_extension_data_byte[ i ] | u(8) |
| } | |
| } | |

| | Descriptor |
|---|---|
| temporal_restoration_data( ) { | |
| if(sps_temporal_restoration_enabled_flag) { | |
| if(sps_temporal_restoration_overwrite_flag){ | |
| ph_temporal_resampling_ratio_changed_flag | u(1) |
| if(ph_temporal_resampling_ratio_changed_flag) | |

-continued

| | Descriptor |
|---|---|
| ph_temporal_resampling_ratio_idx | u(n)/u(v)/ue(v)/ . . . |
| } | |
| } | |
| byte_alignment( ) | |
| } | |

In some implementations, an exemplary end of bitstream RBSP syntax is shown below.

| | Descriptor |
|---|---|
| end_of_bitstream_rbsp( ) { | |
| if(sps_temporal_restoration_enabled_flag ) | |
| eob_num_temporal_remain | u(n)/u(v)/ue(v)/ . . . |
| } | |

In some implementations, sps_temporal_restoration_ratio_index, ph_temporal_resampling_ratio_idx, and/or eob_num_temporal_remain may have same meaning as other embodiments.

In some implementations, sps_temporal_restoration_overwrite_flag equals 1 specifies that it allows modifications to the temporal resample rate at the frame level. sps_temporal_restoration_overwrite_flag equals to 0 specifies that the modifications to the temporal resample rate at the frame level are not permitted.

In some implementations, ph_temporal_resampling_ratio_changed_flag equal to 1 specifies that the temporal restoration is with the changed temporal resampling ratio, TemporalResamplingRatio. ph_temporal_resampling_ratio_changed_flag equal to 0 specifies that the temporal restoration is with the decoder temporal resampling ratio, TemporalResamplingRatio.

In some embodiments, the temporal resampling module performs interpolation such that between every two reconstructed pivot frames requiring interpolation, the process may be always conducted in a forward direction based on the information (such as TemporalResamplingRatio) from the preceding reconstructed pivot frame. In this embodiment, we do not need signaling the tail information at End of bitstream RBSP syntax.

| | Descriptor |
|---|---|
| seq_parameter_set_rbsp( ) { | |
| ... | |
| sps_extension_flag | u(1) |
| if( sps_extension_flag ){ | |
| sps_range_extension_flag | u(1) |
| sps_vcm_extension_flag | u(1) |
| sps_extension_6bits | u(6) |
| if( sps_range_extension_flag ) | |
| sps_range_extension( ) | |
| if( sps_vcm_extension_flag ) | |
| sps_temporal_restoration_enabled_flag | u(1) |
| if(sps_temporal_restoration_enabled_flag) | |
| sps_temporal_restoration_ratio_index | u(n)/u(v)/ue(v)/ . . . |
| } | |
| if( sps_extension_6bits ){ | |
| while( more_rbsp_data( ) ) | |
| sps_extension_data_flag | u(1) |
| } | |
| rbsp_trailing_bits( ) | |
| } | |

An exemplary picture header structure syntax is shown below.

| | Descriptor |
|---|---|
| picture_header_structure( ) { | |
| ... | |
| if( pps_picture_header_extension_present_flag ) { | |
| ph_extension_length | ue(v) |
| temporal_restoration_data( ) | |
| ph_extension_length2 | |
| for( i = 0; i < ph_extension_length2; i++) | |
| ph_extension_data_byte[ i ] | u(8) |
| } | |
| } | |

| | Descriptor |
|---|---|
| temporal_restoration_data( ) { | |
| if(sps_temporal_restoration_enabled_flag) { | |
| ph_temporal_resampling_ratio_changed_flag | u(1) |
| if(ph_temporal_resampling_ratio_changed_flag) | |
| ph_temporal_resampling_ratio_idx | u(n)/u(v)/ue(v)/ . . . |
| } | |
| byte_alignment( ) | |
| } | |

In some implementations, sps_temporal_restoration_ratio_index and/or ph_temporal_resampling_ratio_changed_flag may have same meaning as other embodiments.

In some implementations, ph_temporal_resampling_ratio_idx specifies the temporal resampling scaling factor when sps_temporal_restoration_enabled_flag is enabled and ph_temporal_resampling_ratio_changed_flag is active. In one embodiment, the variable TemporalResampling Ratio is derived as follows: $\text{TemporalResamplingRatio}=2^{\text{ph\_temporal\_resampling\_ratio\_idx}}$ or $=2^{\text{ph\_temporal\_resampling\_ratio\_idx}+1}$.

In some implementations, the variable TemporalResamplingRatio is derived as follows: $\text{TemporalResampligRatio}=2^{\text{sps\_temporal\_restoration\_ratio\_index}+\text{ph\_temporal\_resampling\_ratio\_idx}}$. In some implementations, ph_temporal_resampling_ratio_idx value may be a negative value.

In some implementations, more generally, a final TemporalResamplingRatio is derived as a function of sps_temporal_restoration_ratio_index and ph_temporal_resampling_ratio_idx.

In some embodiments, sps_temporal_restoration_overwrite_flag may be used at sequence level for forward direction interpolation. An exemplary syntax table at sequence level is shown below.

| | Descriptor |
|---|---|
| seq_parameter_set_rbsp( ) { | |
| ... | |
| sps_extension_flag | u(1) |
| if( sps_extension_flag ){ | |
| sps_range_extension_flag | u(1) |
| sps_vcm_extension_flag | u(1) |
| sps_extension_6bits | u(6) |
| if( sps_range_extension_flag ) | |
| sps_range_extension( ) | |
| if( sps_vcm_extension_flag ) | |
| sps_temporal_restoration_enabled_flag | u(1) |
| if(sps_temporal_restoration_enabled_flag) | |
| sps_temporal_restoration_overwrite_flag | u(1) |

-continued

```
                                                         Descriptor
      sps_temporal_restoration_ratio_index               u(n)/u(v)/ue(v)/ . . .
}
if( sps_extension_6bits ){
  while( more_rbsp_data( ) )
      sps_extension_data_flag                            u(1)
}
rbsp_trailing_bits( )
}
```

An exemplary picture header structure syntax is shown below.

```
                                                                  Descriptor
picture_header_structure( ) {
...
  if( pps_picture_header_extension_present_flag ) {
    ph_extension_length                                           ue(v)
    temporal_restoration_data( )
    ph_extension_length2
    for( i = 0; i < ph_extension_length2; i++)
      ph_extension_data_byte[ i ]                                 u(8)
  }
}
```

```
                                                           Descriptor
temporal_restoration_data( ) {
if(sps_temporal_restoration_enabled_flag) {
  if(sps_temporal_restoration_overwrite_flag){
    ph_temporal_resampling_ratio_changed_flag              u(1)
  if(ph_temporal_resampling_ratio_changed_flag)
  ph_temporal_resampling_ratio_idx                         u(n)/u(v)/ue(v)/ . . .
  }
  }
byte_alignment( )
}
```

In some implementations, sps_temporal_restoration_ratio_index and/or ph_temporal_resampling_ratio_idx may have same meaning as other embodiments.

In some implementations, sps_temporal_restoration_overwrite_flag equals 1 specifies that it allows modifications to the temporal resample rate at the frame level. sps_temporal_restoration_overwrite_flag equals to 0 specifies that the modifications to the temporal resample rate at the frame level are not permitted.

In some implementations, ph_temporal_resampling_ratio_changed_flag equal to 1 specifies that the temporal restoration is with the changed temporal resampling ratio, TemporalResamplingRatio. ph_temporal_resampling_ratio_changed_flag equal to 0 specifies that the temporal restoration is with the decoder temporal resampling ratio, TemporalResamplingRatio.

Various embodiments in the present disclosure may include methods for downsampling a video bitstream, which are performed by an encoder, including inverse processes as any portion or all of the processes that are described for the decoder.

Various embodiments in the present disclosure may include methods for encoding and/or decoding a streaming video, which are performed by one or more electronic device (e.g., streaming media player), including any portion or all of the processes for the decoder and/or any portion or all of the processes that are described for an encoder.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 2 shows a computer system (200) suitable for implementing certain embodiments of the disclosed subject matter. The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like. The instructions can be executed on various types of computers or components thereof, including, for example, personal computers, tablet computers, servers, smartphones, gaming devices, internet of things devices, and the like, for example, the computer system as shown in FIG. 2.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a coded video bitstream, the method comprising:

obtaining, by a device comprising a memory storing instructions and a processor in communication with the memory, a coded video bitstream;

determining, by the device from the coded video bitstream, a sequence-level temporal restoration flag for a picture sequence;

when the sequence-level temporal restoration flag indicates that temporal restoration is enabled for the picture sequence, determining, by the device from the coded video bitstream, an index indicating a temporal resampling ratio;

determining, by the device from the coded video bitstream, a number of to-be-restored tail pictures, the number of to-be-restored tail pictures indicating a number of pictures that need to be restored after a last temporal resampling picture in the picture sequence; and decoding, by the device, the coded video bitstream by generating temporal resampling data based on the temporal resampling ratio and the number of to-be-restored tail pictures.

2. The method according to claim 1, wherein, the temporal resampling ratio is derived based on the index by:

being equal to 2^(M+1), wherein M is an unsigned integer value of the index.

3. The method according to claim 1, wherein:

the number of to-be-restored tail pictures is an integer from 0 to the temporal resampling ratio.

4. The method according to claim 1, wherein:

when the sequence-level temporal restoration flag equals to 1, the temporal restoration is enabled for the picture sequence; and when the sequence-level temporal restoration flag equals to 0, the temporal restoration is disabled for the picture sequence.

5. The method according to claim 1, wherein:

a bit length of the number of to-be-restored tail pictures is determined by a logarithm of the temporal resampling ratio.

6. The method according to claim 1, wherein:

the index is an unsigned integer having 2 bits.

7. The method according to claim 1, wherein:

the number of to-be-restored tail pictures is an unsigned integer having 4 bits.

8. The method according to claim 1, further comprising:

deriving a total number of to-be-restored pictures in the picture sequence based on a number of pivot frames, the temporal resampling ratio, and the number of to-be-restored tail pictures.

9. The method according to claim 8, wherein:

the total number of to-be-restored pictures is derived as (NPF−1)*TRR+1+NTP, wherein NPF is the number of pivot frames, TRR is the temporal resampling ratio, and NTP is the number of to-be-restored tail pictures.

10. A method for encoding a video, the method comprising:

obtaining, by a device comprising a memory storing instructions and a processor in communication with the memory, a video;

determining, by the device based on the video, a sequence-level temporal restoration flag for a picture sequence;

when the sequence-level temporal restoration flag indicates that temporal restoration is enabled for the picture sequence, determining, by the device based on the video, an index indicating a temporal resampling ratio;

determining, by the device based on the video, a number of to-be-restored tail pictures, the number of to-be-restored tail pictures indicating a number of pictures that need to be restored after a last temporal resampling picture in the picture sequence; and encoding, by the device, the video into a coded video bitstream by downsampling based on the temporal resampling ratio.

11. The method according to claim 10, wherein, the temporal resampling ratio is derived based on the index by:

being equal to 2^(M+1), wherein M is an unsigned integer value of the index.

12. The method according to claim 10, wherein:

the number of to-be-restored tail pictures is an integer from 0 to the temporal resampling ratio.

13. The method according to claim 10, wherein:

when the sequence-level temporal restoration flag equals to 1, the temporal restoration is enabled for the picture sequence; and when the sequence-level temporal restoration flag equals to 0, the temporal restoration is disabled for the picture sequence.

14. The method according to claim 10, wherein:

a bit length of the number of to-be-restored tail pictures is determined by a logarithm of the temporal resampling ratio.

15. The method according to claim 10, wherein:

the index is an unsigned integer having 2 bits.

16. The method according to claim 10, wherein:

the number of to-be-restored tail pictures is an unsigned integer having 4 bits.

17. The method according to claim 10, wherein:

a total number of to-be-restored pictures in the picture sequence is determined based on a number of pivot frames, the temporal resampling ratio, and the number of to-be-restored tail pictures.

18. The method according to claim 17, wherein:

the total number of to-be-restored pictures is derived as (NPF−1)*TRR+1+NTP, wherein NPF is the number of pivot frames, TRR is the temporal resampling ratio, and NTP is the number of to-be-restored tail pictures.

19. A non-transient computer-readable storage medium for storing an encoded bitstream of a video, the encoded bitstream comprising:

a sequence-level temporal restoration flag for a picture sequence; and when the sequence-level temporal restoration flag indicates that temporal restoration is enabled for the picture sequence, an index indicating a temporal resampling ratio and a number of to-be-restored tail pictures, the number of to-be-restored tail pictures indicating a number of pictures that need to be restored after a last temporal resampling picture in the picture sequence, so that the encoded bitstream is configured to be decoded by generating temporal resampling data based on the temporal resampling ratio and the number of to-be-restored tail pictures.

20. The non-transient computer-readable storage medium of claim 19, wherein:

the temporal resampling ratio is derived based on the index by:

being equal to 2^(M+1), wherein M is an unsigned integer value of the index.

* * * * *